US011799955B2

(12) United States Patent
De Almeida Forjaz de Lacerda et al.

(10) Patent No.: US 11,799,955 B2
(45) Date of Patent: Oct. 24, 2023

(54) DATA SYNCHRONIZATION ACROSS MULTIPLE DEVICES

(71) Applicant: Apple Inc., Cupertino, CA (US)

(72) Inventors: Joao Pedro De Almeida Forjaz de Lacerda, Santa Cruz, CA (US); Giovanni M. Agnoli, San Mateo, CA (US); Bob Bradley, San Jose, CA (US); Joshua R. Ford, Santa Clara, CA (US); Michael D. Ford, Menlo Park, CA (US); Brian E. Korver, San Francisco, CA (US); Marc J. Krochmal, Santa Clara, CA (US); Joseph E. Meyer, Bethesda, MD (US); Jared K. McGann, San Jose, CA (US); Rex C. Ross, San Jose, CA (US); Paul W. Salzman, Palo Alto, CA (US); Christopher G. Skogen, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/420,892

(22) Filed: May 23, 2019

(65) Prior Publication Data
US 2019/0373058 A1   Dec. 5, 2019

Related U.S. Application Data

(60) Provisional application No. 62/679,854, filed on Jun. 3, 2018.

(51) Int. Cl.
*H04L 67/1095* (2022.01)
*H04L 67/1074* (2022.01)
(Continued)

(52) U.S. Cl.
CPC .......... *H04L 67/1095* (2013.01); *H04L 12/12* (2013.01); *H04L 67/1078* (2013.01); *H04W 76/14* (2018.02)

(58) Field of Classification Search
CPC . H04L 67/1095; H04L 12/12; H04L 67/1078; H04W 76/14
See application file for complete search history.

(56) References Cited

U.S. PATENT DOCUMENTS 7,761,414 B2   7/2010  Freedman
7,809,682 B2   10/2010 Paterson et al.
(Continued)

FOREIGN PATENT DOCUMENTS

CN   102546779 A   7/2012
CN   104168667 A   11/2014
(Continued)

OTHER PUBLICATIONS

PCT/US2019/034682 "Notification of Transmittal of the International Search Report and Written Opinion of the International Searching Authority, or the Declaration" dated Sep. 16, 2019, 12 pages.
(Continued)

*Primary Examiner* — Chris Parry
*Assistant Examiner* — Steven C Nguyen
(74) *Attorney, Agent, or Firm* — Kilpatrick Townsend & Stockton LLP

(57) ABSTRACT

One embodiment provides for an electronic device, comprising a non-transitory machine-readable medium to store instructions, one or more processors to execute the instructions, and a memory coupled to the one or more processors. The memory can be configured to store a set of synchronization data associated with interaction between the electronic device and one or more applications and instructions
(Continued)

which, when executed by the one or more processors, configure the one or more processors to retrieve a set of synchronization data to be transmitted from the electronic device to select a transport channel from one of a peer-to-peer channel or a network-based channel and transmit the set of synchronization data from the electronic device to one or more remote devices via the selected transport channel.

20 Claims, 16 Drawing Sheets

(51) Int. Cl.
*H04L 12/12* (2006.01)
*H04W 76/14* (2018.01)

(56) References Cited

U.S. PATENT DOCUMENTS

| | | | |
|---|---|---|---|
| 7,984,161 B2 | 7/2011 | Esteve Balducci et al. | |
| 8,595,834 B2 | 11/2013 | Xie et al. | |
| 9,679,125 B2 | 6/2017 | Bailor et al. | |
| 2008/0058031 A1* | 3/2008 | Deprun | H04W 52/0229 455/574 |
| 2008/0059656 A1 | 3/2008 | Saliba et al. | |
| 2013/0007499 A1* | 1/2013 | Moy | H04L 67/148 713/400 |
| 2013/0286942 A1* | 10/2013 | Bonar | H04L 45/24 370/328 |
| 2014/0236538 A1* | 8/2014 | Messenger | G01C 22/00 702/189 |
| 2015/0271808 A1* | 9/2015 | Liang | H04L 69/14 370/329 |
| 2015/0373132 A1* | 12/2015 | Mukherji | H04L 67/52 709/203 |
| 2016/0094948 A1* | 3/2016 | Kodan | H04W 12/08 455/456.3 |
| 2016/0259857 A1 | 9/2016 | Wang et al. | |
| 2017/0027008 A1* | 1/2017 | Krishnamoorthy | G06F 9/468 |
| 2017/0078962 A1* | 3/2017 | Hassan | G06F 16/27 |
| 2017/0142676 A1 | 5/2017 | Iovanna et al. | |
| 2017/0164291 A1* | 6/2017 | Ludwig | H04W 52/0245 |

FOREIGN PATENT DOCUMENTS

| | | |
|---|---|---|
| CN | 107667515 A | 2/2018 |
| CN | 108076214 A | 5/2018 |

OTHER PUBLICATIONS

Srinivasan, Vijay, et al., "MobileMiner: Mining Your Frequent Patterns on Your Phone", Ubicomp '14, Sep. 13-17, 2014, Seattle, WA USA. 12 Pgs.
"Notice of Preliminary Rejection." dated Nov. 2, 2021 in Korean Patent Application No. 10-2020-7033396. 11 pages (includes English translation).
"First Examination Report," dated Dec. 15, 2021 in Indian Patent Application No. 202017049559. 6 pages with English translation.
Chinese Patent Application No. 201980033460.5 , Office Action, dated Jan. 18, 2023, 8 pages.
Chinese Patent Application No. 201980033460.5 , "Office Action", dated Jun. 29, 2023, 9 pages.

* cited by examiner

DATA SYNCHRONIZATION ACROSS MULTIPLE DEVICES

CROSS-REFERENCE

This application claims priority of U.S. Provisional Patent Application No. 62/679,854, having the title "Data Synchronization Across Multiple Devices," to Joao Pedro De Almeida Forjaz de Lacerda, filed Jun. 3, 2018, which is incorporated by reference in its entirety to the extent that it is consistent with this disclosure.

TECHNICAL FIELD

This disclosure relates generally to electronic devices. More specifically, this disclosure relates to a system and associated methods for data synchronization across multiple electronic devices.

BACKGROUND

Electronic devices (e.g., computers, tables, mobile phones, televisions, etc.) are increasingly mobile and increasingly connected. Further, users may interact with multiple electronic devices during a given time period. For example, a user may interact with one or more applications using a mobile phone for a period of time, then switch to a tablet, or laptop computer for another period of time. When a first device is being used to interact with application(s) various data relating to user interaction with the application(s) may be updated on the first device. Accordingly, techniques to synchronize data on the first device with one or more second devices may find utility, e.g., in processing data among multiple connected devices.

SUMMARY

Embodiments described herein provide techniques to synchronize data input across multiple electronic devices. In some embodiments, techniques described herein enable a first electronic device to select between a peer-to-peer data connection or a network-based communication for the transmission of synchronization data between electronic devices based on various parameters relating to the data and/or the availability and/or quality of various data connections.

One embodiment provides for an electronic device, comprising a non-transitory machine-readable medium to store instructions, one or more processors to execute the instructions, and a memory coupled to the one or more processors. The memory can be configured to store a synchronization data set associated with interaction between the electronic device and one or more applications and instructions which, when executed by the one or more processors, configure the one or more processors to retrieve a set of synchronization data to be transmitted from the electronic device to select a transport channel from one of a peer-to-peer channel or a network-based channel and transmit the set of synchronization data from the electronic device to one or more remote devices via the selected transport channel.

One embodiment provides for a non-transitory machine-readable medium storing instructions which, when executed by one or more processors of an electronic device, cause the one or more processors to perform operations comprising retrieving a set of synchronization data to be transmitted from the electronic device to one or more remote devices, selecting a transport channel from one of a peer-to-peer channel or a network-based channel, and transmitting the set of synchronization data from the electronic device to the one or more remote devices via the selected transport channel.

Other features of the present embodiments will be apparent from the accompanying drawings and from the detailed description, which follows.

BRIEF DESCRIPTION OF THE DRAWINGS

Embodiments of the disclosure are illustrated by way of example, and not by way of limitation, in the figures of the accompanying drawings in which like reference numerals refer to similar elements.

DETAILED DESCRIPTION

Figure 1:
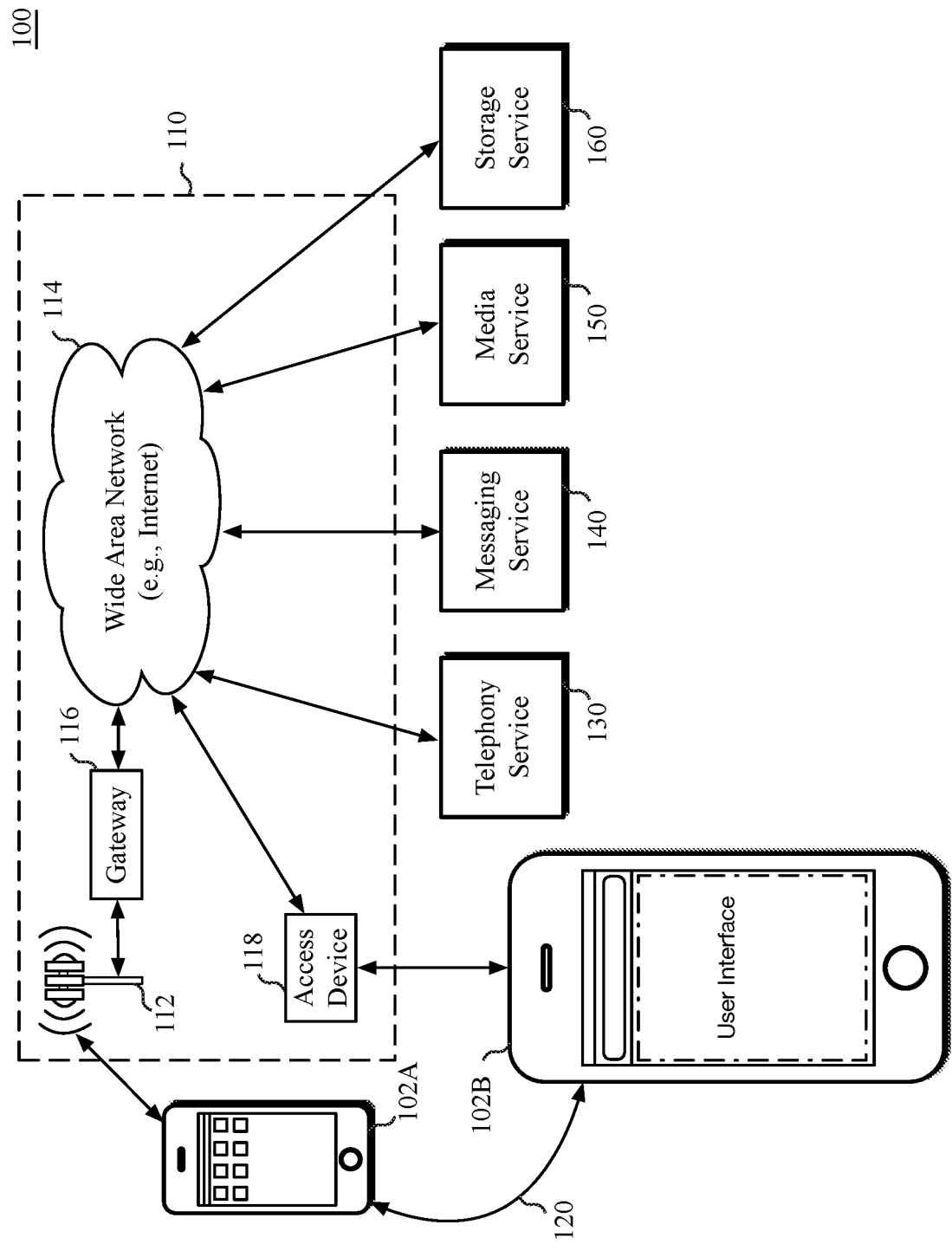
FIG. 1 is a block diagram of an example network operating environment for mobile devices, according to an embodiment.

Embodiments described herein provide techniques to manage remote data input for electronic devices. Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software (as instructions on a non-transitory machine-readable storage medium), or a combination of both hardware and software. Reference will be made in detail to various embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone®, iPad®, and iPod Touch® devices from Apple Computer, Inc. of Cupertino, Calif.

A portion of this disclosure contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. Copyright 2018 Apple Inc.

In the discussion that follows, a computing device that includes a touch-sensitive display is described. It should be understood, however, that the computing device may include one or more other physical user-interface devices, such as a separate display, physical keyboard, a mouse, and/or a joystick. Electronic devices described herein support a variety of applications, such as one or more of the following: a note taking application, a drawing application, a presentation application, a word processing application, a website creation application, a disk authoring application, a spreadsheet application, a gaming application, a telephone application, a video-conferencing application, an e-mail application, an instant messaging application, a fitness application, a photo management application, a digital camera application, a digital video camera application, a web browsing application, a digital music player application, a digital video player application, and/or a home automation application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

Some processes are described below in terms of some sequential operations. However, it should be appreciated that some of the operations described may be performed in a different order. Moreover, some operations may be performed in parallel rather than sequentially.

FIG. 1 is a block diagram of an example network operating environment 100 for mobile devices, according to an embodiment. Mobile device 102A and mobile device 102B can, for example, communicate over one or more wired and/or wireless networks 110 to perform data communication. For example, a wireless network 112, e.g., a cellular network, can communicate with a wide area network (WAN) 114, such as the Internet, by use of a gateway 116. Likewise, an access device 118, such as a mobile hotspot wireless access device, can provide communication access to the wide area network 114.

In some implementations, both voice and data communications can be established over the wireless network 112 and/or the access device 118. For example, mobile device 102A can place and receive phone calls (e.g., using VoIP protocols), send and receive e-mail messages (e.g., using POP3 protocol), and retrieve electronic documents and/or streams, such as web pages, photographs, and videos, over the wireless network 112, gateway 116, and wide area network 114 (e.g., using TCP/IP or UDP protocols). In some implementations, mobile device 102A can place and receive phone calls, send and receive e-mail messages, and retrieve electronic documents over the access device 118 and the wide area network 114. In some implementations, mobile device 102A or mobile device 102B can be physically connected to the access device 118 using one or more cables, for example, where the access device 118 is a personal computer. In this configuration, mobile device 102A or mobile device 102B can be referred to as a "tethered" device. In one embodiment, mobile device 102A can communicate with mobile device 102B via a wireless peer-to-peer connection 120. The wireless peer-to-peer connection 120 can be used to synchronize data between the devices.

Mobile device 102A or mobile device 102B can communicate with one or more services, such as a telephony service 130, a messaging service 140, a media service 150, and a storage service 160 over the one or more wired and/or wireless networks 110. For example, the telephony service 130 can enable telephonic communication between mobile device 102A and mobile device 102B, or between a mobile device and a wired telephonic device. The telephony service 130 can route voice over IP (VoIP) calls over the wide area network 114 or can access a cellular voice network (e.g., wireless network 112). The messaging service 140 can, for example, provide e-mail and/or other messaging services. The media service 150 can, for example, provide access to media files, such as song files, audio books, movie files, video clips, and other media data. A storage service 160 can provide network storage capabilities to mobile device 102A and mobile device 102B to store documents and media files. Other services can also be provided, including a software update service to update operating system software or client software on the mobile devices. In one embodiment, the messaging service 140, media service 150, and storage service 160 can each be associated with a cloud service provider.

Figure 2:
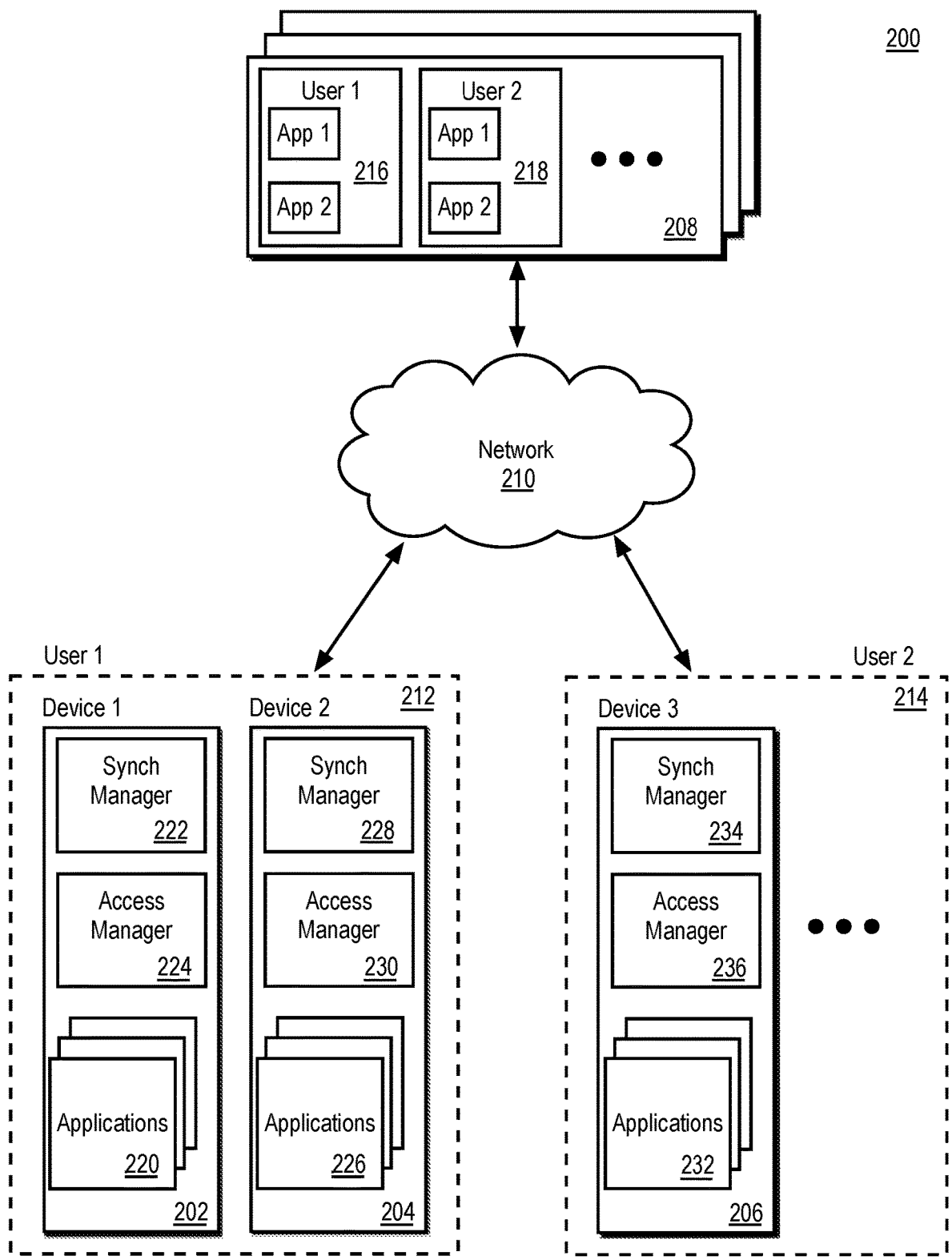
FIG. 2 is a diagram illustrating a system for securely storing data items for synchronization, according to an embodiment.

FIG. 2 is a diagram illustrating a system 200 for securely storing data items for synchronization, according to an embodiment. The system 200 includes a first device 202, a second device 204, a third device 206, and a remote storage location 208. The first device 202, second device 204, third device 206, and remote storage location 208 are communicatively coupled together using one or more networks 210. The one or more networks 210 can include both wired and wireless networks. The network 210 can be, for example, part of a local area network, wide area network, or the Internet.

The first device 202, the second device 204, and the third device 206 can include, for example, desktop or laptop computing devices, mobile devices, tablet devices, personal data assistants, wearable devices, television or television set top boxes, smart speaker devices, or other computing devices. In particular, each of the first device 202 and the second device 204 can be associated with a first user or user account 212. Similarly, the third device 206, and one or more other devices not shown can be associated with a second user or user account 214. The remote storage location 208 can additionally be coupled to many other devices, not shown, that are associated with one or more different users or different user accounts.

In one embodiment the devices can be associated with the respective users or user accounts by forming an association between a unique or quasi-unique device key or device identifier for each device with a unique or quasi-unique account key or account identifier for each account. For example, a key or device identifier for the first device 202 and second device 204 can be associated with a key or account identifier for user or user account 212. A key or device identifier for the third device 206 can be associated with a key or user account identifier for user or user account 214. Such association can be used to enable authenticated access to account-based storage on the remote storage location 208.

The remote storage location 208 can be a single storage location or multiple storage locations. For example, a server, a network addressed storage location, a collection of computing devices, or as part of a cloud storage system presenting virtualized network storage. The remote storage location 208 includes separate logical containers for storing data from different users/user accounts and application combinations. In some examples, a logical container could be a directory in a file system, a data structure, a database, or another kind of data organizational unit. For example, the first user or user account 212 can have containers 216 on the remote storage location 208, one for each individual application associated with the user or user account. Similarly, the second user or user account 214 can have containers 218 for respective applications. Application data items received from individual devices (e.g., the first device 202) are stored in respective containers for that application. The remote storage location 208 can include a storage manager that can create and manage containers as well as generate notifications for devices.

The first device 202 includes one or more applications 220, a synchronization manager 222, and an access manager 224. The one or more applications 220 can include various types of applications such as productivity applications, system applications, games, etc. Each application can be associated with a unique key or other identifier that can be used to identify the application and to identify particular access permissions of that application. In some implementations, one or more applications 220 are sandboxed such that each application is isolated from each other application.

The synchronization manager 222 manages sending data items to the remote storage location 208 and receiving information (e.g., data items or notifications) from the remote storage location 208. The access manager 224 presents available data items to particular applications of the applications 220 in response to a query from the respective applications. The access manager 224 applies one or more access policies to determine what data items will be visible to a particular application of the applications 220. In some embodiments the data synchronization manager 222 and the access manager 224 can reside in the form of logic instructions in the memory that are executable on one or more of the processors of the electronic devices. In one embodiment the data synchronization manager 222 and access manager 236 can also be implemented as logic executable on an embedded microcontroller within the first device 202.

The second device 204 similarly includes one or more applications 226, a synchronization manager 228, and an access manager 230. The applications 220 and application 226 can include one or more of the same applications. The third device 206 similarly includes one or more applications 232, a synchronization manager 234, and an access manager 236. The illustrated elements of the second device 204 and third device 206 can function in a manner similar to the elements described with respect to the first device 202.

Figure 3:
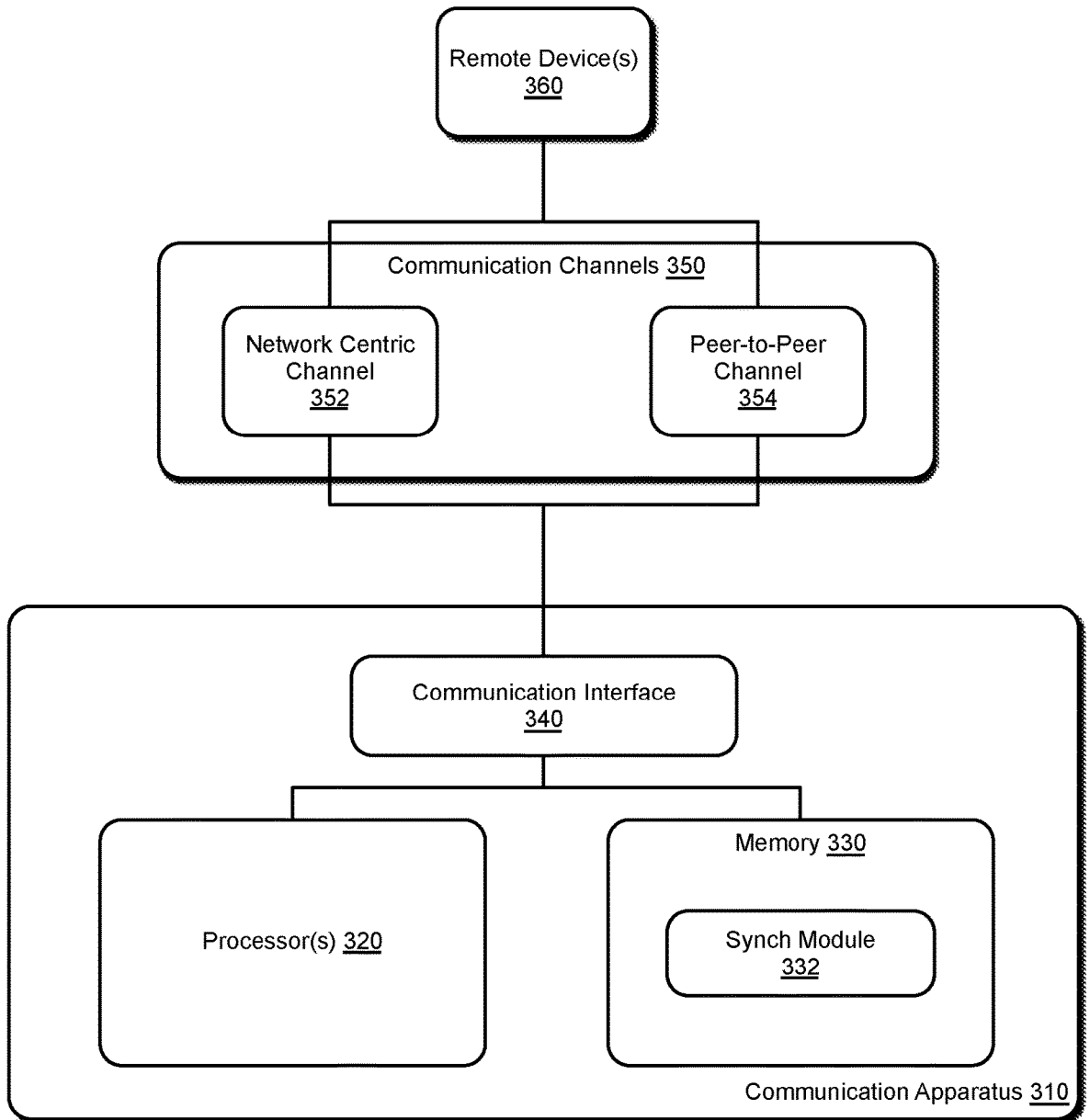
FIG. 3 is a schematic illustration of components in an architecture of an electronic device in which data synchronization across multiple devices may be implemented, according to embodiments.

FIG. 3 is a schematic illustration of components in an architecture in which data synchronization across multiple devices may be implemented, according to an embodiment. One embodiment provides for a communication apparatus 310 including one or more processors 320 communicatively coupled to a memory 330 and to a communication interface 340. The communication apparatus 310 can be included in any of the electronic devices described herein to facilitate electronic communication between devices. In one embodiment a data synchronization manager 332 can reside in the memory 330 and can be executed by the one or more processors 320. A communication interface 340 can be configured to provide a communication connection between the communication apparatus 310 and one or more remote devices 360 via one or more communication channels 350. In one embodiment the connection channels 350 can include including a network centric communication channel 352 or a peer-to-peer communication channel 354. In some embodiments the communication apparatus 310 may be implemented as an integrated circuit device or a portion thereof.

In one embodiment the one or more processors 320 can be wireless baseband processors that can establish communication channels 350 with the remote devices 360 on behalf of an application processor. The communication apparatus 310 can maintain the communication channels 350 with the remote devices 360 while the application processors of the electronic device are in a low power or sleep state. In some configurations an electronic device can enter a wake on wireless state in which one or more components of the device enter a low power state, while the one or more processors 320 can maintain an at least partially active state to receive messages transmitted by one or more remote devices 360. The one or more processors 320, based on the received data or metadata, can wake the device into an active state or maintain the low power state for the device.

Figure 4:
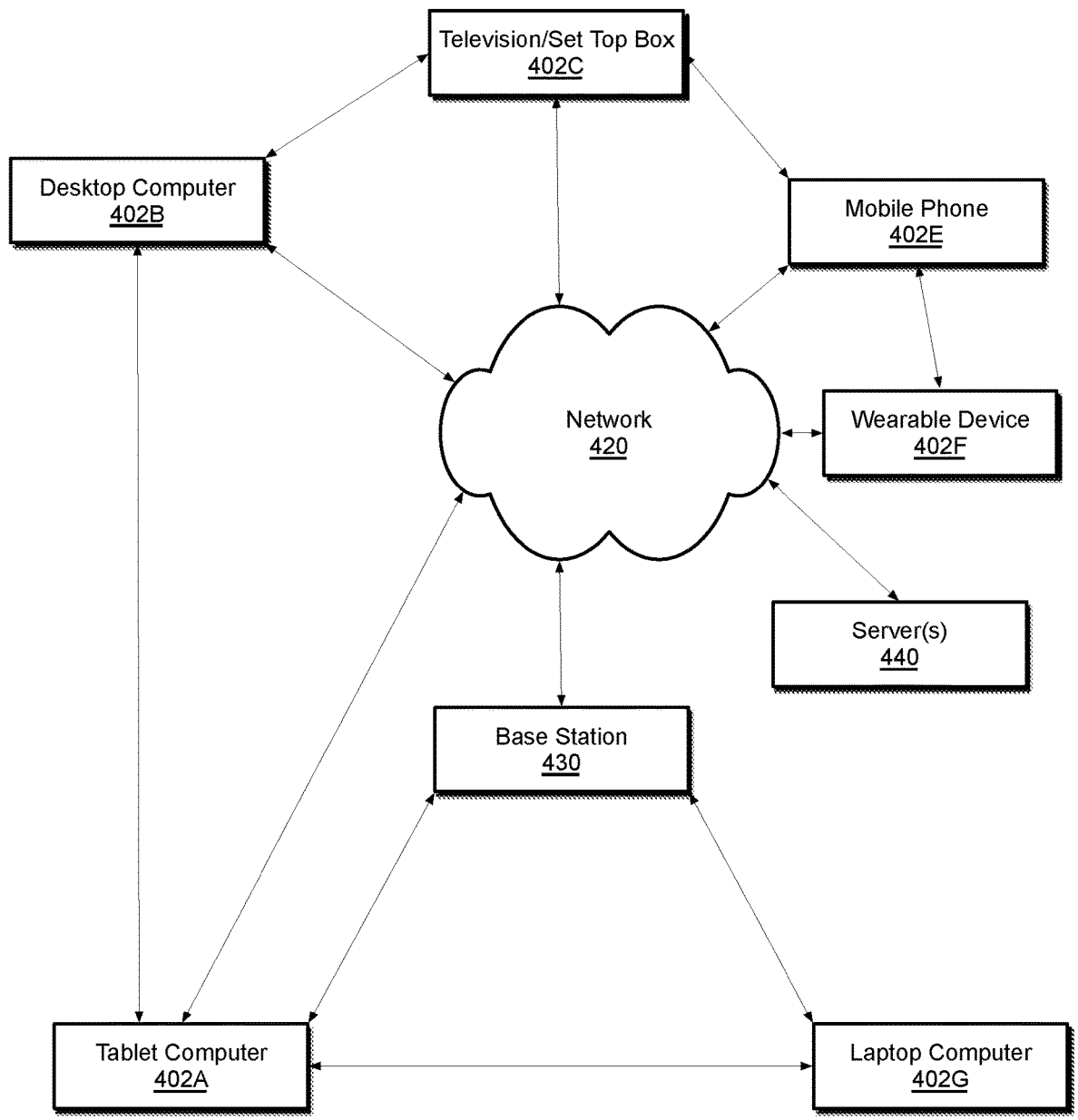
FIG. 4 is a schematic illustration of an environment in which data synchronization across multiple devices may be implemented, according to embodiments.

FIG. 4 is a schematic illustration of an overview of a network environment 400 in which data synchronization across multiple devices may be implemented, according to some embodiments. Referring to FIG. 4, the network environment 400 can include one or more electronic devices such as a tablet computer 402A, a desktop computer 402B, a television or set top box 402C, a mobile phone 402E, wearable device 402F, and/or a laptop computer 402G, which may be referred to collectively as electronic devices 402. Electronic devices 402 within range of one another can establish a peer-to-peer communication channel via a direct communication link (e.g., a Bluetooth link, an infrared (IR) link, or the like). Further, the electronic devices 402 can be connected to a network 420, either directly or via a connection to a base station 430. The base station 430 can be, for example, a network access device (e.g., a router, cellular base station or the like) which provides the electronic devices 402 with network access.

The network 420 can be any suitable type of wired or wireless network such as a local area network (LAN), a wide area network (WAN), or combination thereof. A LAN can be implemented using various network connection technologies such as, but not limited to Ethernet, wireless LAN (e.g., Wi-Fi), and/or wireless personal area networks (WPAN). LAN communication over the network 420 can be performed using network protocols such as, but not limited to transmission control protocol (TCP) and Internet protocol (IP). A WAN can be implemented over various physical layer types including fiber-optic and copper cabling using protocols such as, but not limited to synchronous optical networking (SONET) and synchronous digital hierarchy (SDH).

The various electronic devices 402 can establish a connection with a remote storage location located on one or more servers 440. The remote storage location can be, for example, the remote storage location 208 of FIG. 2. The remote storage location on the one or more servers 440 can be used to synchronize data between the electronic devices 402. In addition to a synchronized data store, the electronic devices 402, if associated with an account or a family of accounts on the one or more servers, can synchronize device behavior and/or activity information between the devices. Synchronized device behavior or activity information can include, for example, device movement data, user health data, and/or an amount of time spent using a particular application. Other types of device behavior or user information that can be synchronized are described below.

The device behavior synchronization can facilitate seamless transition between devices as the user transitions from device to device. For example, user actions or activity performed on a tablet computer 402A can be synchronized with a mobile phone 402E of the user when the user transitions from use of the tablet computer 402A to the mobile phone 402E. In one embodiment, device behavior or activity information can transition between any of the illustrated electronic devices 402 within the environment 400. Synchronization can be performed via the network 420 using the one or more servers 440, or can be performed via a peer-to-peer connection between the electronic devices 402.

Before a peer-to-peer communication channel is established between electronic devices 402, a peer discovery and pairing process is performed between the devices. The peer discovery process enables the electronic devices 402 to discover and preemptively establish connections between before data is available to be synchronized between the electronic devices 402. The peer discovery process, in some instances, can also include user verification that communication the electronic devices 402 should occur. In some embodiments, peer discovery can leverage existing service discovery protocols that facilitate locating devices and/or services on a wireless or other network, such as the Simple Service Discovery Protocol (SSDP) developed by the UPnP Forum or the Bonjour networking technology developed by Apple Inc. (published as IETF RFC 6762 and IETF RFC 6763 and referred to herein as "Bonjour"). In a device discovery service, a device can advertise information indicating its existence, address, and optionally additional information about its capabilities. Other devices can browse the advertisements and identify devices of interest based on the broadcast information. Using the advertised address, a browsing device can initiate communication with the advertiser.

Depending on the network and discovery service, advertising can optionally include real-time broadcasting of information (e.g., through a multicast or beacon signal) and/or providing advertisement information to a central repository (e.g., at a network access point) from which other devices can retrieve the information. Browsing of advertisements can include detecting broadcast advertisements and/or retrieving advertisement information from the central repository. In some embodiments, electronic devices that are attached to a power source, such as an electrical outlet, can continuously perform advertisement and discovery for the peer-to-peer connection service. Mobile user devices can enable discovery of the peer-to-peer connection service based on the location of the user device. For example, and in one embodiment, a geo-fence trigger is enabled on the mobile device, such that peer-to-peer connection discovery is enabled when the mobile device is within a geographic proximity to a location designated as the home location of the user device.

When one of the electronic devices 402 is discovered by another one of the electronic devices 402, a network data connection (e.g., TCP, UDP, etc.) can be established between the devices. To avoid connection races between devices that are both advertising and discovering, the device with the lexicographically lower persistent identifier initiates the connection between devices. The persistent identifier of a device is derived from an anonymized identifier that is advertised via the discovery service. In one embodiment, to derive the persistent identifier based on advertised information make use of data exchanged via a previously performed pairing process. In such embodiment, a data connection cannot be established between devices until some form of data exchange is performed between devices, such as, for example, if the devices are in wireless radio range of each other. Alternatively, the devices each come into possession of shared secret data, which can be distributed to the devices if the devices are each associated with a user account of a family of user accounts. This pre-connection data exchange can enable the electronic devices 402 to learn a persistent identifier for each device that can be used to establish a peer-to-peer connection. Once a data connection is established, a secure communication session can be established between the communal smart home device and the companion device. The communal smart home device and the connected companion device can then exchange presence and reachability information. Once interconnected, the electronic devices 402 can enter a wake-on-wireless (WoW) state as needed, when data is not being exchanged over the peer-to-peer connection. In one embodiment, an electronic device that is connected to a power source can remain active to reduce first-message latency.

In the event connectivity is lost between electronic devices 402, the discovery service can be re-enabled and used to search for the device on the local network. If the missing device is re-discovered, the data connection between devices can be re-established. If the missing device cannot be discovered, state discovery service information in the records of the missing device is reconfirmed and cleaned. The searching device can then attempt to establish communication with the missing device via a secure internet session. In one embodiment, part of the presence and reachability information exchanged when establishing a data connection includes a device identifier, identifier token, relay identifier, or another form of identification token that can be used to reach or enable message exchange with the missing device, for example via a peer-to-peer or relayed Internet connection. If a secure Internet connection can be successfully established over the network 420 with the previously missing device, peer-to-peer connection messages can be exchanged over the secure Internet connection.

In the event interconnected electronic devices 402 are connected over the network 420 (e.g., via an Internet-based connection) and a local connection becomes available, a peer-to-peer connection can be established via the electronic devices 402. For example, if mobile phone 402E were to cross a geo-fence boundary, the mobile phone 402E can enable a discovery protocol (e.g., SSDP, Bonjour, etc.) to search for other electronic devices 402. In one embodiment, connection switching can be performed whenever connectivity is lost between connected electronic devices 402 or if the devices determine that a better connection is available. Local connections can be preferred to Internet connections, as local connections presumably are lower latency. Additionally, it may be less resource intensive from a device and infrastructure standpoint to maintain a local connection instead of an Internet connection. For example, where device behavior or activity synchronization is to occur between electronic devices 402 via the one or more servers 440 over the network 420, the rate of data exchange between the electronic devices 402 may be throttled due to server demand. In one embodiment, electronic device 402 can provide updates to certain types of data to the one or more servers 440 only during specified update interval for the electronic device 402. Further updates may be delayed until the next update interval. However, local data exchange between the electronic devices 402 can occur unthrottled and at lower latency using a peer-to-peer connection between devices. In one embodiment, the various peer-to-peer connection can be used as a mesh-rely to propagate device activity updates across the set of electronic devices 402, provided that the electronic devices have an established trust relationship.

In one embodiment, some devices, such as the wearable device 402F (e.g., electronic watch device or another wearable electronic accessory) can synchronize data over a peer-to-peer channel 354 with another device (e.g., a mobile phone device 402E) while also synchronizing data via a connection over a network-centric channel 352 via the network 420. For example, the wearable device 402F can have a primary synchronization channel with a companion electronic device, such the mobile phone device 402E. The wearable device 402F can also receive synchronization data via the network centric channel 352, for example, while the wearable device 402F is charging. In one embodiment, some data to be synchronized with the wearable device 402F can be synchronized with the mobile phone device 402E or another companion device. Dividing synchronization duties between the wearable device 402F and the mobile phone 402E can enable rich data to be delivered to the wearable device 402F in a timely manner without negatively impacting the power and performance of the wearable device 402F. In one embodiment, data stored on the wearable device 402F can be periodically stored to remote storage of the servers 440 as backup data, even if such data will not be immediately synced with other devices.

Figure 5:
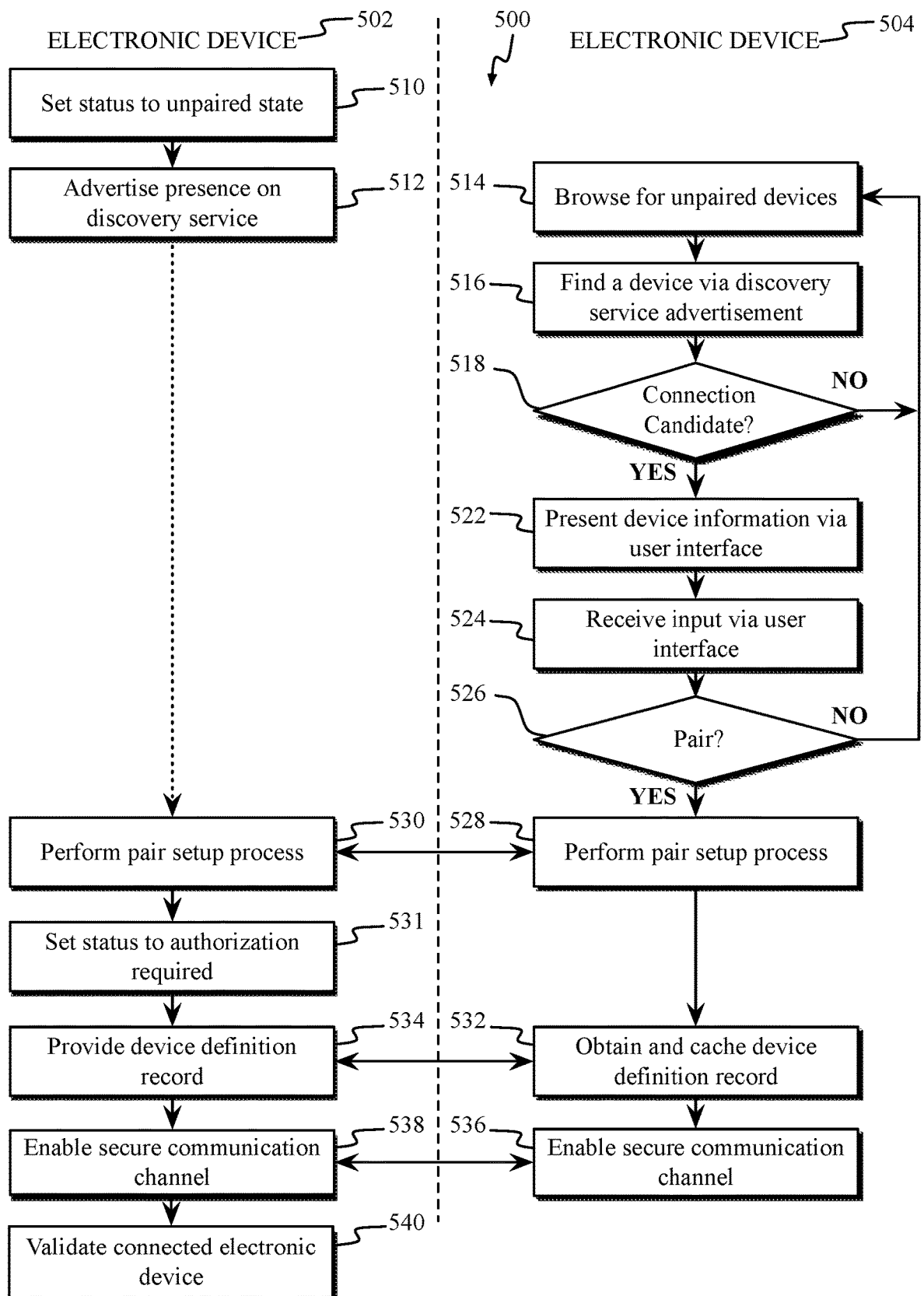
FIG. 5 is a flow diagram of operations of a discovery process used to discover and connect electronic devices, according to embodiments described herein.

FIG. 5 is a flow diagram of operations of a discovery process 500 used to discover and connect electronic devices, according to embodiments described herein. The illustrated discovery process 500 includes operations performed on electronic device 502 and electronic device 504. Electronic device 502 and electronic device 504 can each be for example, a tablet computer 402A, desktop computer 402B, television or set top box 402C, mobile phone 402E, wearable device 402F or laptop computer 402G as in FIG. 4. In one embodiment, the peer-to-peer connection established between electronic device 502 and electronic device 504 can be referred to as a companion link connection, and connected peers can be referred to as companion devices. Devices that are able to form a peer-to-peer connection as described herein can advertise support for a companion service.

In one embodiment, as shown at block 510, electronic device 502 can set a status bit to indicate that the device is currently unpaired or is otherwise looking for a companion device with which to pair. The status bit can be a bit in a status flag indicator that listed in the status information advertised by electronic device 502. At block 512, electronic device 502 can advertise its presence via a discovery protocol (e.g., SSDP, Bonjour, etc.) as having support for the companion link service. For instance, using Bonjour, electronic device 502 can advertise itself with a name and a service type. The name can be a user-readable name for the companion discovery; in some instances, the advertised name can be the name specified in the companion discovery information service instance of a device definition record. The service type can be defined for the uniform accessory protocol (e.g., service type "_companion-link._tcp"). The advertisement can also include additional information. Similar information can be distributed using other service discovery protocols and techniques. For instance, using SSDP, companion discovery can include advertising a name and service type URI using a multicast HTTP NOTIFY message. The URI can be used by electronic device 504 to retrieve additional information via a unicast request to electronic device 502.

After electronic device 502 begins advertising the companion link service via a service discovery protocol, electronic device 504 can discover electronic device 502 when browsing for unpaired devices, as shown at block 514. No particular timing is required between the beginning of advertisement and the beginning of service browsing, although electronic device 504 will be unable to discover electronic device 502 unless electronic device 502 discovery advertisement is detectable when electronic device 504 browses.

In one embodiment, electronic device 504 can browse for unpaired devices in response to a trigger, such as a trigger provided by an application execution on electronic device 504. In one embodiment, electronic device 504 can browse for unpaired devices when electronic device 504 is placed in physical proximity to an unpaired device. For example, an out-of-box proximity setup for electronic device 502 can include a data exchange over a short-range wireless communication mechanism (e.g., using Bluetooth and/or Bluetooth Low Energy (BLE), Near-Field Communication (NFC), Peer-to-Peer Wi-Fi, etc.), which can trigger electronic device 504 to browse for unpaired devices. In one embodiment, electronic device 505 can attempt discovery of other devices via a device registry that stores identifiers for other devices associated with a cloud service account, a family of cloud service accounts, or a cloud service account of a friend of the user of electronic device 504.

At block 516, personal device 504 can find a device via the discovery service advertisement, for example, by detecting the advertisement performed at block 512. At block 518, electronic device 504 can determine, based on the advertisement, whether the discovered device is a connection candidate, such as the unpaired electronic device 502. In one embodiment, electronic device 504 can determine the discovered device is a connection candidate when the discovered device is advertising the companion link service. Electronic device 504 can check the discovery status flags to determine whether a peer connection can be established with electronic device 502. For example, electronic device 504 can check the advertised protocol version to determine whether the companion link protocol version of electronic device 502 is compatible with the companion link protocol supported by electronic device 504. If electronic device 504 determines that electronic device 502 is not advertising to establish a companion link, electronic device 504 can return to block 514 and continue to browse.

At block 522, electronic device 504 can present information about electronic device 502 to the user via a user interface, such as a display device of electronic device 504. At block 524, personal device 504 can receive input from the user via the user interface regarding actions to perform with the detected device. For example, the user can provide input indicating whether electronic device 504 should establish a pairing with electronic device 502. Electronic device 504 can present any or all of the information obtained from the advertisement data provided by electronic device 502 and prompt the user to indicate whether electronic device 504 should connect to electronic device 502. Requesting user confirmation can help to avoid spurious or unwanted pairings between devices.

At block 526, electronic device 504 can interpret the user input received at block 524 and determine whether to pair with electronic device 502. In addition to user approval to initiate a pairing operation, other operations can be performed to complete the pairing operation to minimize risk of a pairing occurring without approval of the rightful owner/operator of electronic device 504, as completing the pairing procedure can allow electronic device 502 to accept queries of a personal nature regarding the user of electronic device 504. For example, electronic device 504 and/or electronic device 502 may request the input of a passcode known to the user of electronic device 504. In one embodiment, biometric verification (e.g., fingerprint, facial recognition, etc.) can be requested by electronic device 502 and/or electronic device 504 to complete the paring operation at block 526.

If the user directs electronic device 504 to decline the pairing or a user verification operation fails, electronic device 504 can return to block 514 to look for other accessories or devices. If electronic device 504 and electronic device 502 are to pair, at block 528 and block 530, electronic device 504 and electronic device 502 can respectively execute a pair setup process. In some embodiments, the pair setup process can be used to establish encryption keys to facilitate secure communication between electronic device 504 and electronic device 502. In some embodiments, user confirmation can be incorporated into the pair setup process, and a separate user confirmation prior to initiating pair setup is not required. In one embodiment, the pair setup process enables the establishment of a trusted relationship between electronic device 502 and electronic device 504. The established trust relationship can be later verified during setup of a secure communication session.

If the pair setup process completes successfully, at block 531 electronic device 502 can update device status information to indicate that authorization is now required to communicate with the accessory and/or that the accessory is now paired with at least one instance of electronic device 504, for example, by updating a status flag indicator within the advertised device data.

At block 532, electronic device 504 can obtain and cache a device definition record from electronic device 502, which can provide the record upon request at block 534. The device definition record can include a set of services supported by the device and/or other relevant characteristics that can enable other electronic device 504, as well as other connected devices, to determine how to control, connect with, or otherwise interact with electronic device 502. Where electronic device 404 caches the device definition record, the information can be used to facilitate detecting state changes in electronic device 502. In some embodiments, electronic device 504 can also cache information from the advertisement data provided by electronic device 502, which can also be used to detect state changes in electronic device.

At blocks 536 and 538 electronic device 504 and electronic device 502 can begin to exchange data used to establish a secure communication channel. The data exchange can include a key or certificate exchange between the devices. The key exchange can be protected via a shared secret exchanged between devices, where the shared secret can be exchanged using an out-of-band communication method. Additionally, the data exchange can include the exchange of one or more long term keys between the devices, which may themselves be protected by one or more short-term keys. Once a pairing is established, the pairing can be leveraged to provide end-to-end message encryption such that only paired devices can read messages exchanged between the devices. In one embodiment, the secure communication channel is a bidirectional channel, enabling either device communicating on the channel to initiate a message exchange. During a message exchange, whichever device initiates the communication session is referred to as the client device, while the device accepting the session is referred to as the server device. In one embodiment, the first message exchanged between devices is an information exchange message. The client device can send an initial information message including feature flags or other device information. The server device can then respond with an information message as to supported features. Once the secure communication channel is established and the information exchange occurs, the communicating devices can enter an idle state if there are no immediate operations pending.

In one embodiment, electronic device 502 can perform an additional operation at block 540 to validate the connected personal device 504 as a companion device. In such embodiment, the discovery process 500 may be performed with multiple devices, but some types of data may only be exchanged with specific devices.

It will be appreciated that the discovery and pairing process described herein is illustrative and that variations and modifications are possible. Operations described as sequential may be executed in parallel, order of steps may be varied, and steps may be modified, combined, added or omitted. Furthermore, while the SSDP and Bonjour services are used as examples of a device discovery service, similar concepts can be applied in the context of other device discovery services. In some embodiments, prior to determining whether to pair with electronic device 502 or any other discovered device, electronic device 504 can request a definition record (or a portion thereof) from the paring candidate device, which can be requested, for example, via an HTTP request.

In some embodiments, the discovery process 500, or a similar process, can be used to detect state changes in paired devices. For example, a state number value that is advertised by a device can be incremented when device state changes. When a device advertises a state change, other paired devices can advertise the state change, for example, by broadcasting an updated Bonjour TXT record, and a paired device that has previously cached the device record can detect the change by comparing the broadcast values of the state number with the cached value.

The secure communication channel established between the devices at block 536 and block 538 can be used to exchange companion link messages. In one embodiment, before companion link messages are exchanged over a companion link, a secure session is established or re-established between electronic device 502 and electronic device 504. In one embodiment, establishing a session includes performing a pair-verify process to verify the pairing between devices. The pair-verify process relies upon a previously established paring relationship between electronic device 502 and electronic device 504. For example, and in one embodiment, establishing a companion link session between devices can require the persistent identifier of the devices, which can be derived from an anonymized identifier that is advertised via the discovery service. However, to derive the persistent identifier based on the advertised information can make use of one or more elements of data that were exchanged during the pairing process between the devices. In one embodiment, the pair-verify process can include the generation of short-term public key pairs that are used to encrypt or sign messages exchanged during the verification process, as well as a verification of previously exchanged long-term key pairs that were exchanged during the initial pairing of the devices. The pair-verify process can be performed each time a secure session is established between devices using a companion link connection.

Having described various structures of an electronic device which may be adapted to implement data synchronization between electronic devices and the various types of data connections that can be established between the devices, operating aspects of communication channel election will be described with reference to FIGS. 6-7, which are flowcharts illustrating operations in a method to implement data synchronization between multiple devices according to embodiments. FIG. 8A-8D describes device activity information that can be synchronized between devices. FIG. 9 illustrates a flow diagram of device activity synchronization.

Figure 6:
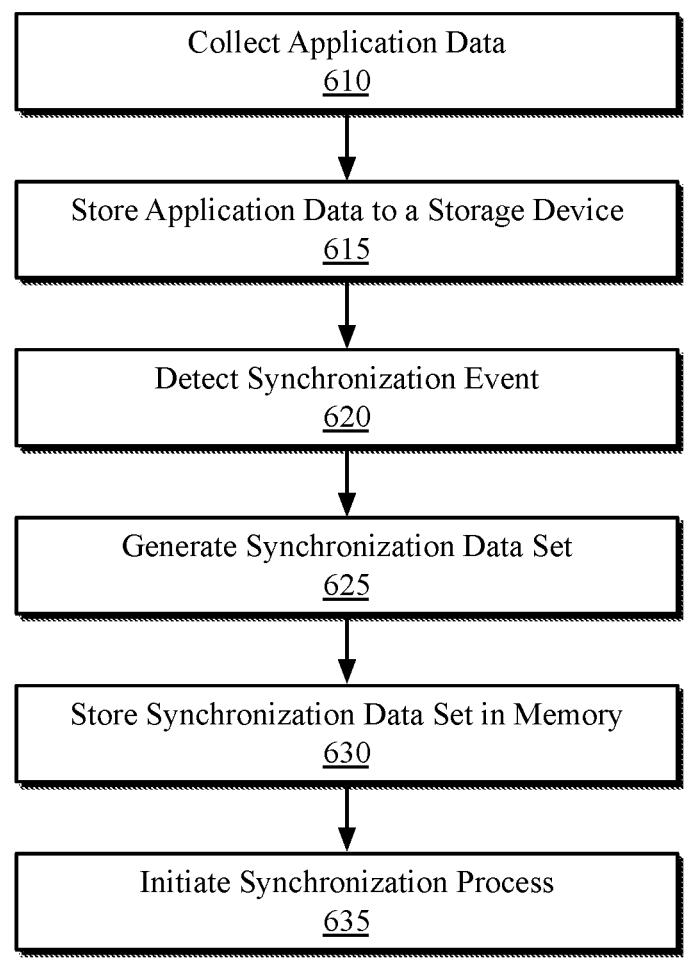
FIG. 6 is a flow diagram of a method for data synchronization across multiple devices, according to embodiments.

Referring to FIG. 6, data synchronization manager 222 can initiate a process to collect application data from an electronic device. By way of example, at operation 610 data synchronization manager 222 can initiate a process to collect application data in response to an environmental condition. In some examples the application data can comprise context data associated with one or more applications executing on the electronic device 102 including, but not limited to, an amount of time a user has engaged with the application in a given time period, session data, connection data, and the like. Environmental conditions upon which application data can be collected include the elapse of a synchronization time period associated with the electronic device or with one or more applications executing on the electronic device. In some examples the time period may be static. In other examples the time period may be dynamic in the sense that the time period can vary in response to operating condition. For example, if a time limit is defined for a particular user on a particular application the time period can decrease as the user approaches the time limit. Alternatively, or in addition, data synchronization manager 222 can initiate a synchronization process in response to one or more environmental conditions such as the electronic device crossing a geolocation threshold or entering a particular geographic region, or in response to a time-based parameter or an activity-based parameter.

At operation 615 the data synchronization manager 222 stores the application data to a storage device, which can be a non-volatile storage device or a volatile storage device, such as a system memory. At operation 620 the data synchronization manager 222 detects a synchronization event. In some examples the synchronization event can be a user switching from a first electronic device to a second electronic device, different from the first electronic device. In other examples the synchronization event can be a synchronization time period or an activity-based parameter. For example, the synchronization time period can be set to a relatively long time period during periods of time in which the electronic device is not used extensively. By contrast, the synchronization time period can be set to a relatively short time period during periods of time in which the electronic device is used extensively. It will be recognized that other events can be used to initiate a synchronization process. In one embodiment the electronic device can detect a flag or bit set in advertisement data of a connected device that indicates that the device is requesting a data update from other connected devices. In one embodiment, a cloud storage service via which the electronic device can synchronize data over the network centric channel can set a bit that indicates that updated data is requested.

At operation 625, in response to the synchronization event, the synchronization manager 222 generates a synchronization data set. In some examples the synchronization data set can comprise the application data stored to the storage device in operation 615 and supplemental data such as one or more application identifiers, time stamps, location data, or the like. In some examples the synchronization data set can be compressed to reduce the amount of data required to be transferred to other devices during a synchronization process. At operation 630 the synchronization manager stores the synchronization data set in a memory such as the memory 330 illustrated in FIG. 3, or another memory device.

At operation 635 the synchronization manager 222 initiates a synchronization process. Details of the synchronization process are described with reference to FIG. 7. In the diagram depicted in FIG. 7 the operations executed during the synchronization process can be implemented by the data synchronization manager 222, alone or in combination with other components of electronic device 202.

Figure 7:
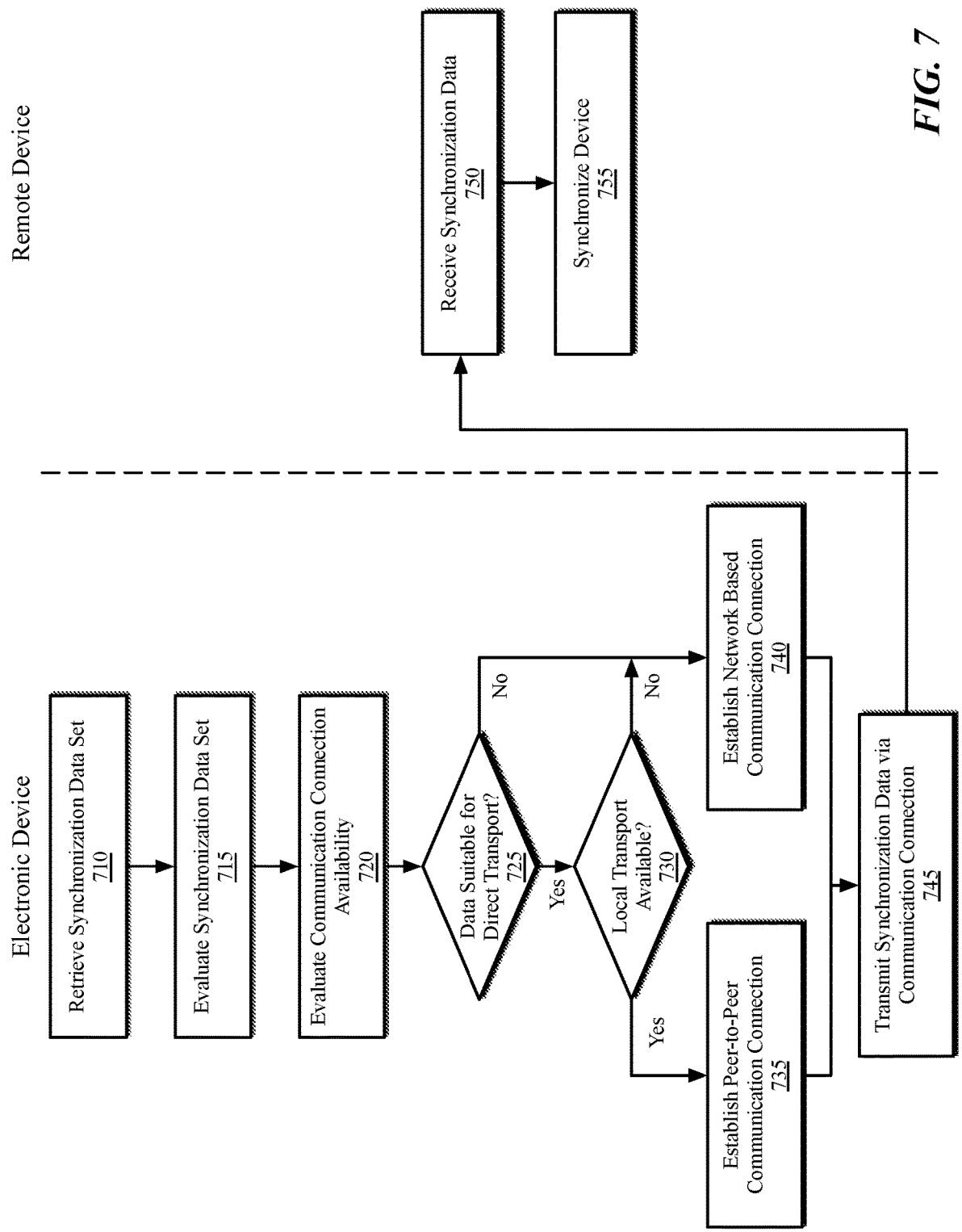
FIG. 7 is a flow diagram of a method for data synchronization across multiple devices, according to embodiments.

Referring to FIG. 7, at operation 710 the data synchronization manager 222 retrieves the synchronization data set stored in memory in operation 630, which data is referred to as a synchronization data set. At operation 715 the data synchronization manager 222 evaluates the synchronization data set to determine various parameters indicative of whether the synchronization data set is suitable for transmission to a remote device via a peer-to-peer data connection. For example, the data synchronization manager 222 can determine a size of the synchronization data set, a data type associated with the data in the synchronization data set, or whether the synchronization data set comprises time-sensitive data.

At operation 720 the data synchronization manager 222 evaluates the availability of communication connections with one or more remote devices proximate the electronic device 202 to determine whether the communication connections are suitable for transmitting the synchronization data set to the remote device(s) proximate the electronic device 202. For example, in the embodiment depicted in FIG. 3 the data synchronization manager 222 can receive information from the communication interface 340 relating to the bandwidth available for communication over the network centric communication channel 352 and/or the peer-to-peer communication channel 354.

At operation 725 the data synchronization manager 222 determines whether the synchronization data set is suitable for transmission to a remote device via direct (e.g., peer-to-peer) communication connection. In some examples the data synchronization manager 222 can receive bandwidth information from the communication interface 340 which indicates an amount of bandwidth available via a peer-to-peer communication connection. The data synchronization manager 222 can then determine from the bandwidth information and the size of the synchronization data set an approximate amount of time required to transfer the synchronization data set to a remote device. If the time required to transmit the synchronization data set is less than a threshold transfer time parameter, then the data synchronization manager 222 determines that the synchronization data set is suitable for transfer via the peer-to-peer communication channel 354. By contrast, if the time required to transmit the synchronization data set is not less than a threshold transfer time parameter then the data synchronization manager 222 determines that the synchronization data set is not suitable for transfer via the peer-to-peer communication channel 354.

The transfer time parameter can be a static parameter, e.g., a threshold number of milliseconds, or can be set dynamically in response to operating conditions of the electronic devices or characteristics of the synchronization data. For example, streaming video data can require a short transfer time parameter. By contrast, static data can tolerate longer transfer time parameters.

If, at operation 725 the synchronization data set is not suitable for transmission via the peer-to-peer communication connection then control passes to operation 740 and the data synchronization manager 222 establishes a network-based communication channel 352 with the remote device(s) 360 designated to receive the synchronization data set. At operation 745 the data synchronization manager 222 transmits the synchronization data to the remote device(s) via the network-based communication channel 352.

By contrast, if at operation 725 the synchronization data set is suitable for transmission via the peer-to-peer communication channel 354 the control passes to operation 730, whereupon the data synchronization manager 222 determines whether a direct (e.g., peer-to-peer) connection is available with the remote device(s) 360. In some examples the data synchronization manager 222 can determine a sleep state of a remote device 360 to which the synchronization data set is to be transmitted. For example, the communication interface 340 can attempt to initiate a communication connection with a remote device 360. If the communication interface 340 receives a "no wake" signal from a remote device 360 (e.g., in the event that the application processor in the remote device 360 is in a sleep state) and, in response to the "no wake" signal can determine that a direct transport channel is not available. By contrast, if the communication interface 340 receives a suitable reply from the remote device 360 then the data synchronization manager 222 can determine that a direct (e.g., peer-to-peer) communication channel is available.

If, at operation 730, the data synchronization manager 222 determines that a direct (e.g., peer-to-peer) communication channel is not available control passes to operation 740 and the data synchronization manager 222 establishes a network-based communication channel 352 with the remote device(s) 360 designated to receive the synchronization data set. At operation 745 the data synchronization manager 222 transmits the synchronization data to the remote device(s) via the network-based communication channel 352.

By contrast, if at operation 730 the data synchronization manager 222 determines that a direct (e.g., peer-to-peer) communication channel 352 is available then control passes to operation 735 and the data synchronization manager 222 establishes a direct (e.g., peer-to-peer) data channel 354 with the remote device(s) 360. In one embodiment, at operation 735, the data synchronization manager 222 can pre-establish a direct data channel 354 with the peer device as soon as the peer device comes into wireless range to reduce first message latency. At operation 745 the data synchronization manager 222 transmits the synchronization data to the remote device(s) via the direct (e.g., peer-to-peer) communication channel 354.

At operation 750 the remote device(s) 360 receive the synchronization data set via the selected communication channel, and at operation 755 the remote device(s) 360 can use the synchronization data set to synchronize the remote device(s) 360 with the electronic device 202.

Although the use of a no wake signal is described to determine whether a peer-to-peer communication channel can be established with a remote device, embodiments described herein provider other techniques to minimize device wakes. For example, the data synchronization manager 222, when attempting to communicate with a remote device, can indicate that the remote device should not reply if the application processor of the remote device is in a low power state.

In some embodiments an electronic device can only wake a peer electronic device via the use of a specific wake pattern. When a device transitions into a low power state, the device can configure the BLE firmware of the device to wake the main CPU only if the firmware receives an advertisement with a specific wake data pattern. In one embodiment the wake data pattern for a device can be derived using an identity resolving key for the device. For example, the wake pattern can include a keyed hash of a prefix string and a BLE address, using the identity resolving key as the key. The identity resolving key, in one embodiment, is a different key than the identity resolving key used to enable BLE connections, but is an alternate identity resolving key that is used for device identification and authentication purposes. When an electronic device intends to wake a remote device, the electronic device can scan for the remote device using BLE to find the current BLE address for the remote from the advertisement packet. The electronic device can then use the BLE address and the alternate identity resolving key to generate the wake data pattern. When the remote device receives the advertised wake pattern, the remote device can wake one or more cores of the CPU of the remote device.

The communication channel logic that enables data synchronization between multiple devices can be used to synchronize a variety of device data for a variety of circumstances. In one embodiment, the logic can be used to synchronize activity between devices associated with the same account, or a family of accounts, that may be considered personal information data. The present disclosure recognizes that the use of such personal information data, in the present technology, can be used to the benefit of users. For example, the health activity of a user can be synchronized between various devices as the user transitions from device to device. Synchronization of device activity between users can enable each device to be more proactive in predicting needs or interests of a user at any given time. Screen time for devices used by children can be limited by parents, and such screen time limitations can be applied across multiple devices. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Figure 8A:
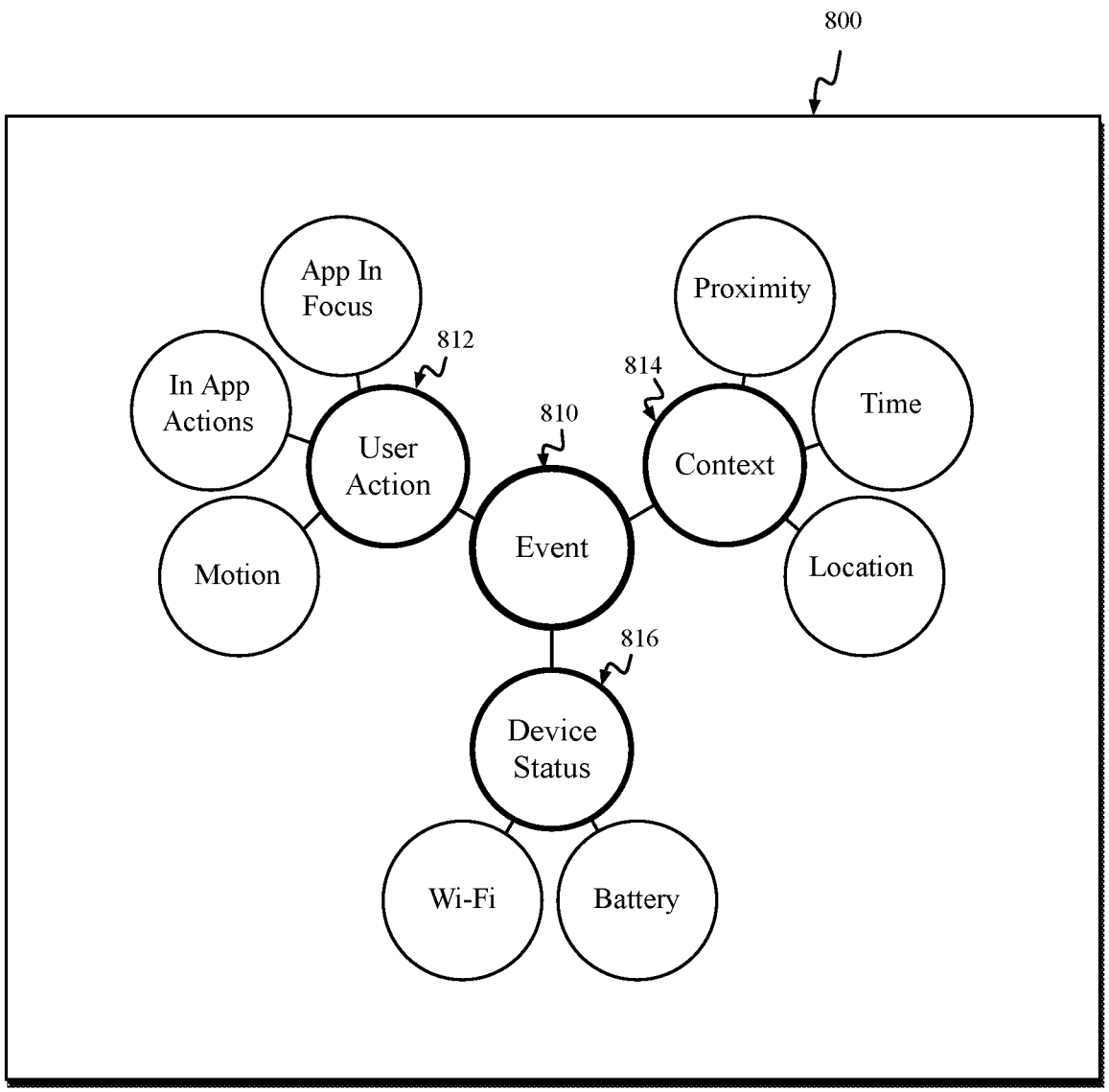
FIG. 8A-8C are block diagrams that illustrate device activity synchronization, according to embodiments.
Figure 8B:
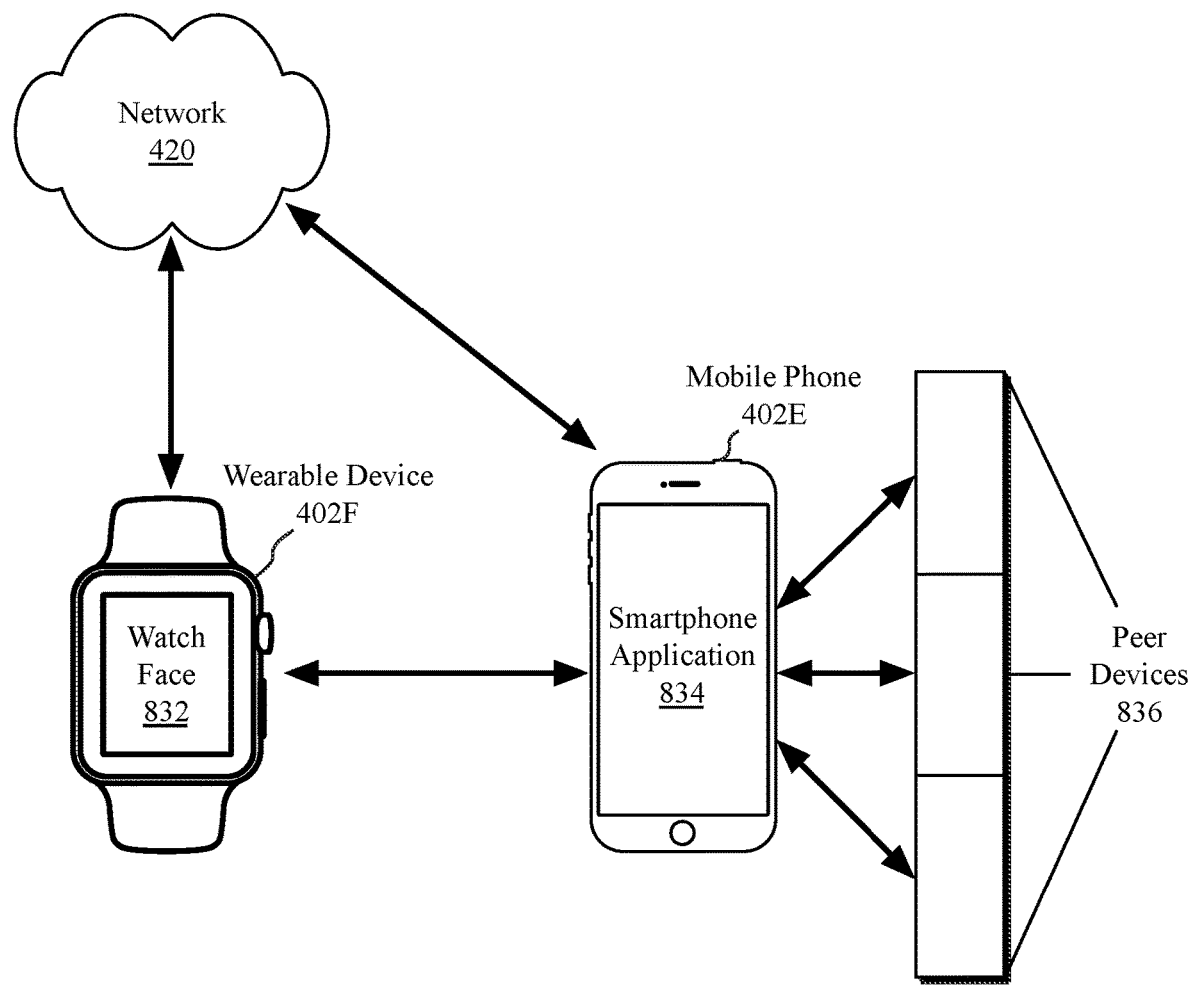
Figure 8C:
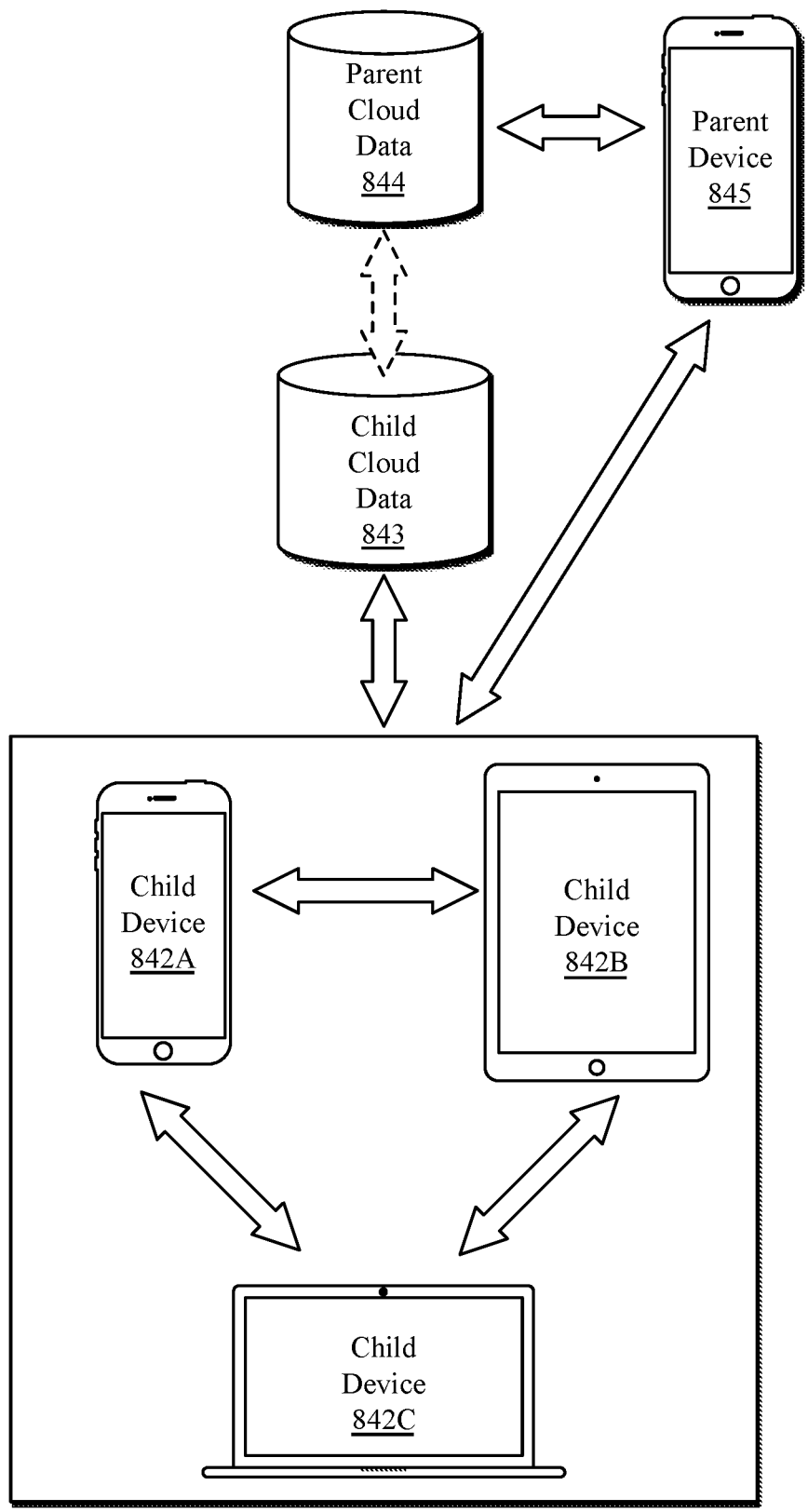
Figure 9:
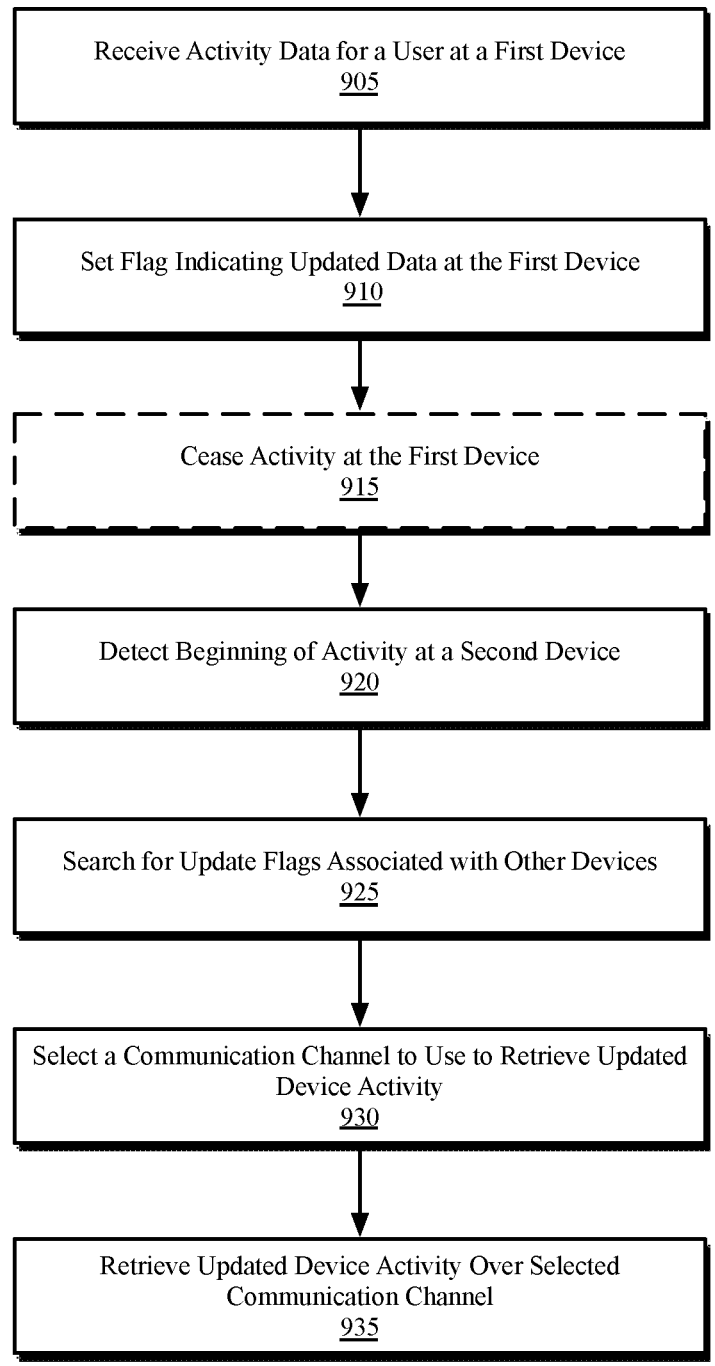
FIG. 9 illustrates a flow diagram of device activity synchronization.

FIG. 8A-8C are block diagrams that illustrate device activity synchronization, according to embodiments. FIG. 8A illustrates exemplary set of device activity 800 that can be gathered at a device and synchronized across devices. FIG. 8B illustrates alternate or multiple communication channels can be used to facilitate the transfer of rich data between devices. FIG. 8C illustrates device usage synchronization using network-based remote synchronization and peer-to-peer synchronization between devices.

As shown in FIG. 8A, a variety of device activity 800 can be synchronized across devices. In one embodiment, various types of event data 810 can be synchronized. Event data 810 can be gathered from multiple devices for a user and combined into aggregated user data. Event data 810 can be gathered from a variety of user devices, including wearable electronic devices, mobile devices such as smartphones and tablet computing devices, laptop computing devices, and desktop computing devices. Event data 810 includes but is not limited to user action data 812, context data 814, and device status data 816.

User action data 812 includes, for example, device motion data, in app actions, and app in focus data. Motion data can include raw accelerometer data for the device as well as processed accelerometer data that indicates information such as a number of steps taken by a user, distance traveled, exercise data, flights of stairs taken, standing versus sitting metrics, and the like. In app actions include activity performed within an application, such as purchases made in an online app store or media store, in-app purchases made within an application, websites visited by a web browser, photographs taken by a camera application, and other user actions within a given application. App in focus data includes information about which applications are active and the duration which the user makes use of those applications.

Context data 814 includes context information associated with other events 810, such as user actions 812 or device status 816. For example, for each user action 812, context data 814 can be gathered to provide additional information about those actions. For example, if a user regularly runs for exercise, the time and location of those runs can be recorded as context data 814 by the active device of the user during the run. During the run, proximity information can also be recorded, such as proximity of the active device to devices of other users or to geographic points of interest for the user.

Event data 810 can also include device status 816, such as Wi-Fi device status, including signal strength analysis and available access points to the device. Device status 816 can also include battery information including current and historical battery energy level, charge status, and the percentage of battery usage that is devoted to particular activities or applications.

The various events 810 and other device activity 800 can be synchronized between active user devices using the communication channel selection techniques described herein. Device activity 800 can be gathered from an active device and synchronized among other active devices as the user transitions from device to device. The device activity 800 can be used to generate informative graphs or displays to a user, such as an activity or health display, or activity-based watch faces for a wearable electronic device.

As shown in FIG. 8B, alternate or multiple communication channels can be used to facilitate the transfer of rich data between a mobile phone 402E and a wearable device 402F. The wearable device 402F, in one embodiment is a smartwatch device, although the concepts described herein are not limited to watch devices. The wearable device 402F can be paired with a mobile phone 402E or another one of the electronic devices described herein. As also described herein, the mobile phone 402E can alternately sync via a network-centric channel 352 via the network 420 or via a peer-to-peer channel 354 with peer devices 836, as further illustrated in FIG. 4.

In one embodiment the wearable device 402F can perform peer-to-peer syncing with peer devices 836 using the mobile phone 402E as a proxy. The wearable device 402F can also sync using a network-centric channel 352 via the network 420, for example, when the wearable device 402F is attached to an external power source to while charging an internal battery of the wearable device 402F.

In one embodiment, a smartphone application 834 can use an API available on the mobile phone 402E to provide shortcut data to the wearable device 402F over the peer-to-peer communication channel 354 between the wearable device 402F and the mobile phone 402E. The smartphone application 834 can also provide context information to inform the wearable device 402F as to when display of the shortcut information would be relevant to the user. In one embodiment the smartphone application can also provide template information that specifies the appearance of the shortcut. The shortcut provided to the wearable device 402F can be displayed on a watch face 832 and can have an appearance defined by the smartphone application 834. When selected, the shortcut allows the user to perform some action associated with the smartphone application 834. In one embodiment the shortcut allows the user to launch an application on the wearable device 402F or the mobile phone 402E with a launch context that takes the user directly to an internal screen of the application. Alternatively, the shortcut can perform a specific background action for the user. For example, a shortcut can be displayed via the watch face 832 to take a user directly to a news feed of a social media application or to a specific story of a news application. A shortcut can also be displayed that performs a specific background action for a user. For example, a shortcut can be displayed to enable a user to order food or drink via a smartphone application 834.

In one embodiment the shortcut provided to the wearable device 402F can be displayed on a watch face 832 at a time and/or location in which the shortcut would be relevant to the wearer of the wearable device. The time and/or location in which the shortcut would be relevant to the wearer of the wearable device 402F can be determined by the wearable device based on the context information synced over the peer-to-peer communication channel 354 between the wearable device 402F and the mobile phone 402E, as well as based on historical information synced to the wearable device 402F via a network centric channel 352 established over the network 420. Historical information regarding the shortcut can be provided that indicates past times and/or locations in which an action associated with a shortcut was performed by the wearer of the wearable device 402F. Such historical information can be provided to the wearable device 402F via the network centric channel 352 established over the network 420, as such information may be of such volume that it would be best synchronized while the wearable device 402F has an external power source. For example, where a user has been determined to regularly order food or drink via the smartphone application 834 at a specific time or a specific location, the smartphone application 834 can request the wearable device 402F to display a shortcut to the user via the watch face 832 at a relevant time and/or location based on historical activity of the user. The request to display the relevant shortcut can be relayed from the smartphone application 834 to the wearable device 402F via the peer-to-peer channel 354 established between the mobile phone 402E and the wearable device 402F. Data used to construct the relevant shortcut displayed on the watch face 832 of the wearable device 402F can be synced to the wearable device via the network centric channel 352 established over the network 420 with a remote storage location, such as a storage location associated with a cloud services provider.

In one embodiment, the wearable device 402F and the mobile phone 402E each have machine learning models that can train based on behavioral data to determine the most relevant times to display shortcuts to a user via the watch face 832. The machine learning models can each be trained while the wearable device 402F and the mobile phone 402E are each attached to an external power source. The data used to train the devices can be retrieved over the network-centric channel 352 via the network 420. Furthermore, graphical data provided by the smartphone application 834 to display in conjunction with shortcuts can be provided via a network-centric channel 352 established via the network 420 by the wearable device 402F when the wearable device 402F is connected to an external power source. In one embodiment, the wearable device 402F can have the opportunity to display a large number of shortcuts via the watch face 832 during a given time period. Data synced with the wearable device 402F via a network-centric channel 352 established via the network 420 can be used to train a local machine learning model, which can then determine which shortcuts are most relevant to a user within a given time period. The most relevant shortcuts can then be displayed via the watch face. In one embodiment, data used to train the machine learning model on the wearable device 402F can also be synced with the mobile phone 402E, which can also train a machine learning model to enable the mobile phone 402E to determine if the display of any relevant shortcuts should be requested of the wearable device 402F.

As shown in FIG. 8C, a subset of behavioral data can be used to allow a user to manage or limit the amount of time personally spent using their electronic devices. Additionally, a parent can apply usage limits, such as overall usage limits or application usage limits, to devices associated with a child account in a family of cloud services accounts.

In one embodiment, usage data can be synchronized among a set of child devices 842A-842C, which are devices associated with a cloud services account that has been designated as a child user. The child devices 842A-842C can individually be any electronic device described herein. The various elements of usage data described herein can be synchronized between devices using peer-to-peer or network-based and the synchronization can be performed using peer-to-peer or network-based (e.g., cloud) data synchronization. Limits can be set for specific categories of applications/websites, and/or specific device functions (e.g., phone time, screen time in general, audio time). Limits can also be set for overall device usage time. Activity on each of the child devices 842A-842C can be aggregated and stored to child cloud data 843. If a first set of actions are performed on child device 842A, after which, a second set of actions are performed on child device 842B, updated data on the actions performed on child device 842A can be provided to child device 842B, either via a peer-to-peer connection between child device 842A and child device 842B, or by child device 842A providing the activity data to child cloud data 843. Activity performed on child device 842B can also be provided to child cloud data 843, for example, during an update interval in which child device 842B is allowed to provide updates to child cloud data 843.

In one embodiment, the child cloud data 843 can be optionally synchronized with parent cloud data 844 to enable a parent device 845 to observe aggregate and/or individualized activity relative to imposed limits. While the parent device 845 is illustrated as a smartphone device, the parent device 845 can be any electronic device described herein. In one embodiment, activity data on the child devices 842A-842C is synchronized with the parent device 845 using a peer-to-peer connection. In one embodiment, the parent device 845 can also receive health data (e.g., heart rate, etc.) collected by the child devices 842A-842C. The health data can be synchronized among the various child devices 842A-842C and the aggregate data can be transmitted to the parent device 845. As the set of child devices 842A-842C can each synchronize to maintain a coherent set of aggregate data, should the parent device 845 come within peer-to-peer wireless range of any one of the child devices 842A-842C, the parent device 805 can receive updated activity data over a peer-to-peer connection.

FIG. 9 illustrates a flow diagram of a method 900 of device activity synchronization, according to an embodiment. The method 900 can be performed by an electronic device described herein to synchronize device activity with another electronic device associated with the same cloud services account or family of accounts.

As shown at block 905, the method 900 includes to receive activity data for a user at a first device. The first device can be an electronic device as described herein (e.g., mobile device 102A-102B, etc.). For example, a data provider can provide raw or discretized data to an update pool to be synchronized with other devices. The provided data can be stored in a memory, such as memory 330 as in FIG. 3. The first user device can then set a flag indicating the presence of updated data at the first device, as shown at block 910. For example, the electronic device can set a bit in the advertisement data that indicates that updated information is available on the device. In one embodiment, the method 900 includes to optionally cease activity at the first device, as shown at block 915.

As shown at block 920, the method 900 additionally includes for activity synchronization logic to detect the beginning of activity at a second device. As shown at block 925, when the activity begins at the second device, the second device can search for update flags associated with other devices of which the second device is aware. The other devices can be devices associated with a cloud services account or family of cloud services accounts. The other devices can be devices that are within wireless radio range of the second device, including, but not limited to the first device.

The second device can then select a communication channel to use to retrieve the updated device activity, as shown at block 930. The communication channel can be selected using channel selection logic as described herein. The second device can then retrieve updated device activity over a selected communication channel, as shown at block 935.

Exemplary Frameworks and Application Programming Interfaces

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embodiment, call APIs from different providers such as a set of APIs from an OS provider and another set of APIs from a plug-in provider and another set of APIs from another provider (e.g., the provider of a software library) or creator of the another set of APIs.

Figure 10:
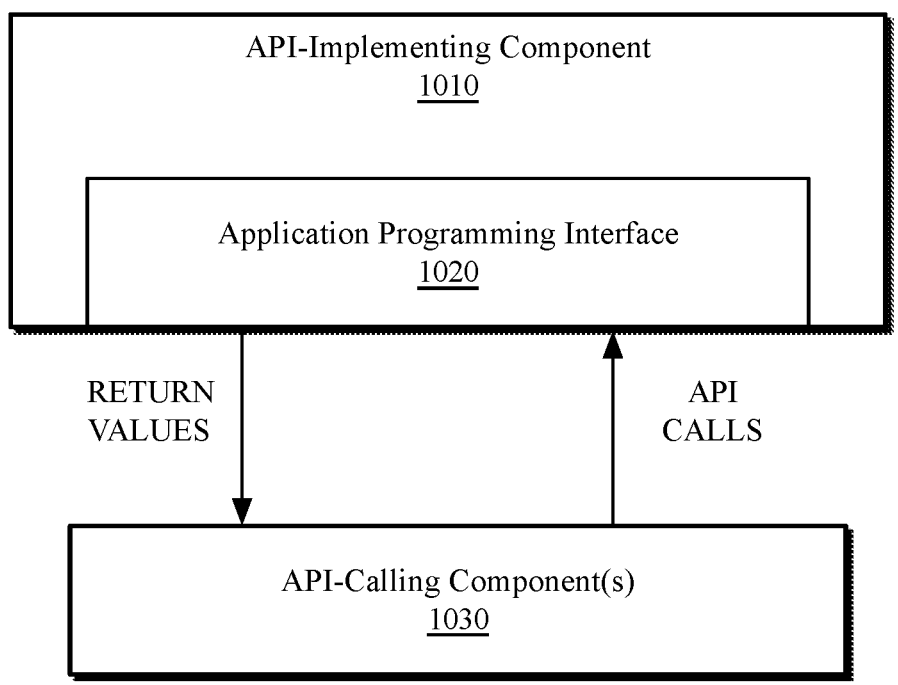
FIG. 10 is a block diagram illustrating an exemplary API architecture, which may be used in some embodiments.

FIG. 10 is a block diagram illustrating an exemplary API architecture, which may be used in some embodiments of the invention. As shown in FIG. 10, the API architecture 1000 includes the API-implementing component 1010 (e.g., an operating system, a library, a device driver, an API, an application program, software or other module) that implements the API 1020. The API 1020 specifies one or more functions, methods, classes, objects, protocols, data structures, formats and/or other features of the API-implementing component that may be used by the API-calling component 1030. The API 1020 can specify at least one calling convention that specifies how a function in the API-implementing component receives parameters from the API-calling component and how the function returns a result to the API-calling component. The API-calling component 1030 (e.g., an operating system, a library, a device driver, an API, an application program, software or other module), makes API calls through the API 1020 to access and use the features of the API-implementing component 1010 that are specified by the API 1020. The API-implementing component 1010 may return a value through the API 1020 to the API-calling component 1030 in response to an API call.

It will be appreciated that the API-implementing component 1010 may include additional functions, methods, classes, data structures, and/or other features that are not specified through the API 1020 and are not available to the API-calling component 1030. It should be understood that the API-calling component 1030 may be on the same system as the API-implementing component 1010 or may be located remotely and accesses the API-implementing component 1010 using the API 1020 over a network. While FIG. 10 illustrates a single API-calling component 1030 interacting with the API 1020, it should be understood that other API-calling components, which may be written in different languages (or the same language) than the API-calling component 1030, may use the API 1020.

The API-implementing component 1010, the API 1020, and the API-calling component 1030 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 11A:
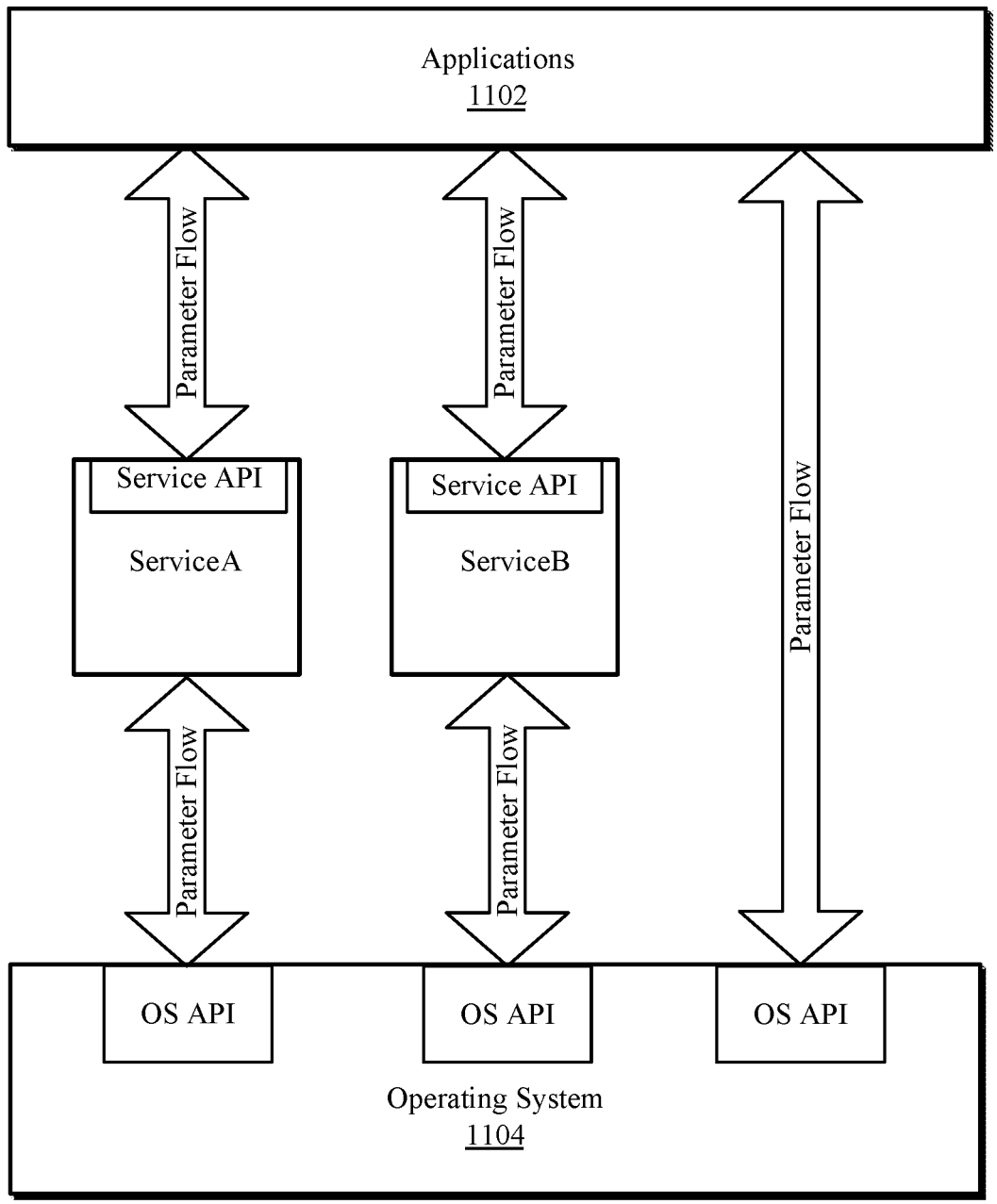
FIG. 11A-11B are block diagrams of exemplary API software stacks, according to embodiments.
Figure 11B:
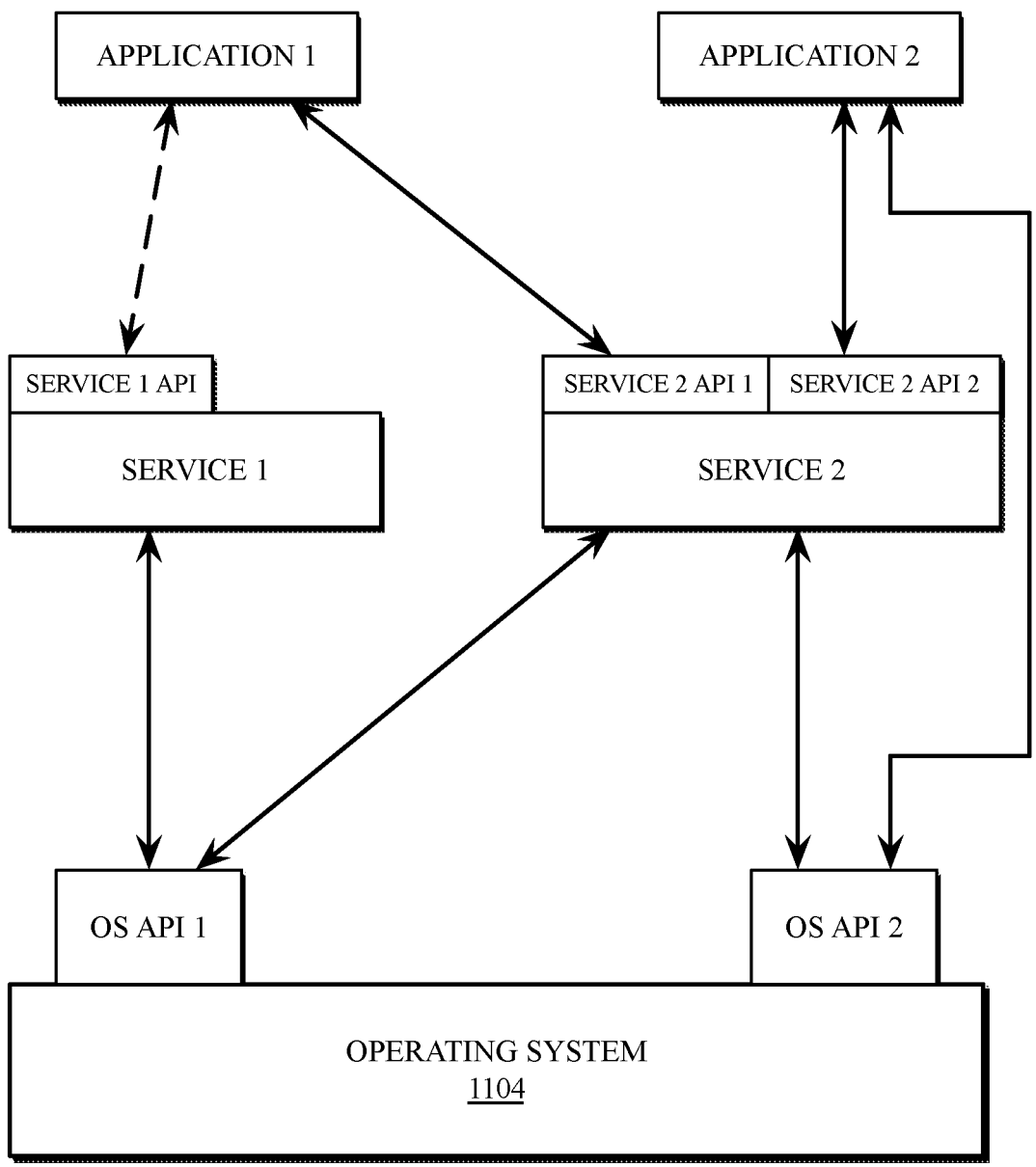

FIG. 11A-11B are block diagrams of exemplary API software stacks 1100, 1110, according to embodiments. FIG. 11A shows an exemplary API software stack 1100 in which applications 1102 can make calls to Service A or Service B using Service API and to Operating System 1104 using an OS API. Additionally, Service A and Service B can make calls to Operating System 1104 using several OS APIs.

FIG. 11B shows an exemplary software stack 1110 including Application 1, Application 2, Service 1, Service 2, and Operating System 1104. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Additional Exemplary Computing Devices

Figure 12:
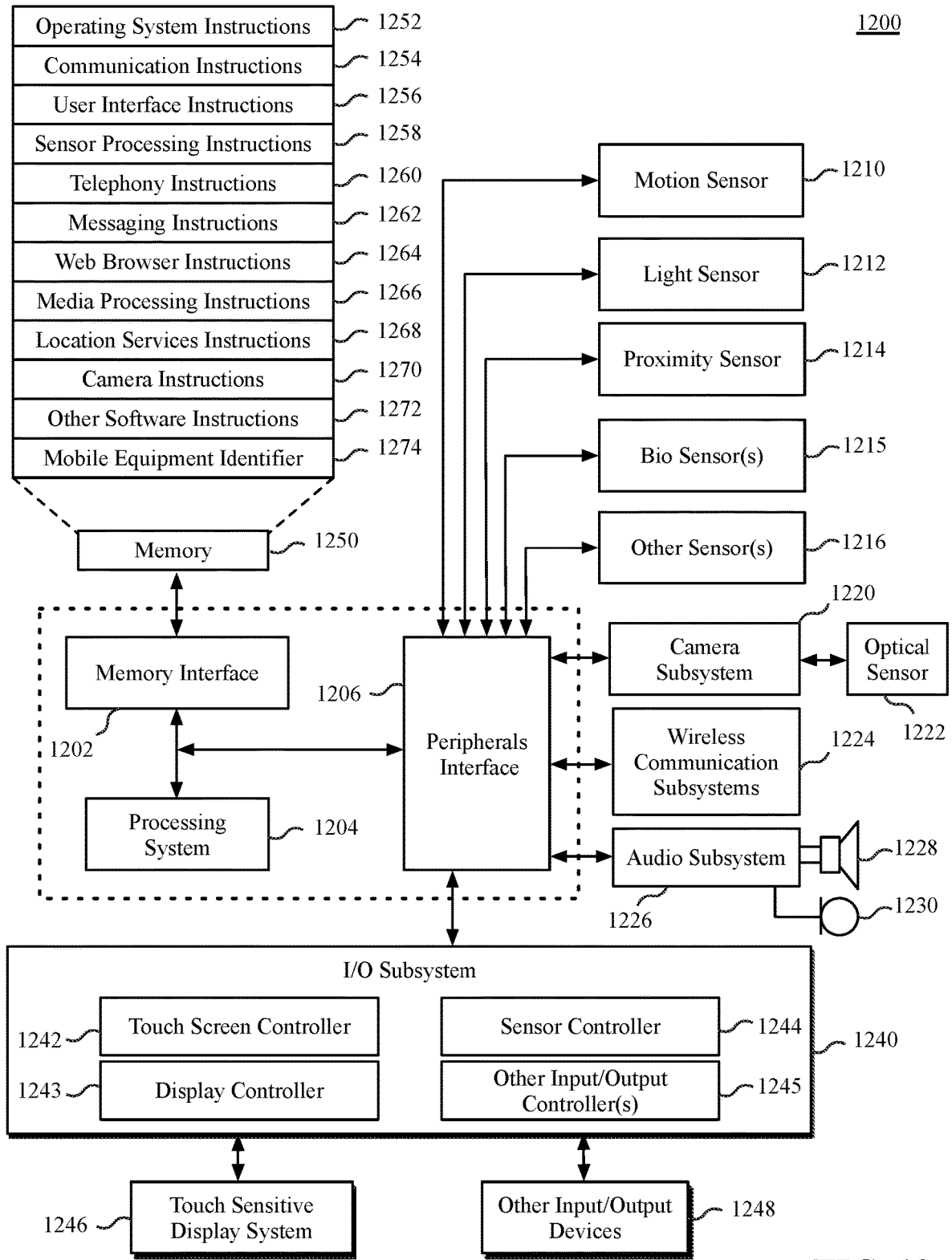
FIG. 12 is a block diagram of mobile device architecture, according to an embodiment.

FIG. 12 is a block diagram of a device architecture 1200 for a mobile or embedded device, according to an embodiment. The device architecture 1200 includes a memory interface 1202, a processing system 1204 including one or more data processors, image processors and/or graphics processing units, and a peripherals interface 1206. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. The various components can be coupled by one or more communication buses or signal lines. The various components can be separate logical components or devices or can be integrated in one or more integrated circuits, such as in a system on a chip integrated circuit. The memory interface 1202 can be coupled to memory 1250, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1206 to facilitate multiple functionalities. For example, a motion sensor 1210, a light sensor 1212, and a proximity sensor 1214 can be coupled to the peripherals interface 1206 to facilitate the mobile device functionality. One or more biometric sensor(s) 1215 may also be present, such as a fingerprint scanner for fingerprint recognition or an image sensor for facial recognition. Other sensors 1216 can also be connected to the peripherals interface 1206, such as a positioning system (e.g., GPS receiver), a temperature sensor, or other sensing device, to facilitate related functionalities. A camera subsystem 1220 and an optical sensor 1222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1224, which can include radio frequency receivers and transmitters and/or optical (e.g., infrared) receivers and transmitters that can be configured receive or transmit data packets and/or data streams from a remote source. The specific design and implementation of the wireless communication subsystems 1224 can depend on the communication network(s) over which a mobile device is intended to operate. For example, a mobile device including the illustrated device architecture 1200 can include wireless communication subsystems 1224 designed to operate over a GSM network, a CDMA network, an LTE network, a Wi-Fi network, a Bluetooth network, or any other wireless network. In particular, the wireless communication subsystems 1224 can provide a communications mechanism over which a media playback application can retrieve resources from a remote media server or scheduled events from a remote calendar or event server.

An audio subsystem 1226 can be coupled to a speaker 1228 and a microphone 1230 to facilitate voice-enabled functions, such as voice recognition, voice replication, digital recording, and telephony functions. In smart media devices described herein, the audio subsystem 1226 can be a high-quality audio system including support for virtual surround sound.

The I/O subsystem 1240 can include a touch screen controller 1242 and/or other input controller(s) 1245. For computing devices including a display device, the touch screen controller 1242 can be coupled to a touch sensitive display system 1246 (e.g., touch-screen). The touch sensitive display system 1246 and touch screen controller 1242 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1246. Display output for the touch sensitive display system 1246 can be generated by a display controller 1243. In one embodiment, the display controller 1243 can provide frame data to the touch sensitive display system 1246 at a variable frame rate.

In one embodiment, a sensor controller 1244 is included to monitor, control, and/or processes data received from one or more of the motion sensor 1210, light sensor 1212, proximity sensor 1214, or other sensors 1216. The sensor controller 1244 can include logic to interpret sensor data to determine the occurrence of one of more motion events or activities by analysis of the sensor data from the sensors.

In one embodiment, the I/O subsystem 1240 includes other input controller(s) 1245 that can be coupled to other input/control devices 1248, such as one or more buttons, rocker switches, thumb-wheel, infrared port, USB port, and/or a pointer device such as a stylus, or control devices such as an up/down button for volume control of the speaker 1228 and/or the microphone 1230.

In one embodiment, the memory 1250 coupled to the memory interface 1202 can store instructions for an operating system 1252, including portable operating system interface (POSIX) compliant and non-compliant operating system or an embedded operating system. The operating system 1252 may include instructions for handling basic system services and for performing hardware dependent tasks. In some implementations, the operating system 1252 can be a kernel.

The memory 1250 can also store communication instructions 1254 to facilitate communicating with one or more additional devices, one or more computers and/or one or more servers, for example, to retrieve web resources from remote web servers. The memory 1250 can also include user interface instructions 1256, including graphical user interface instructions to facilitate graphic user interface processing.

Additionally, the memory 1250 can store sensor processing instructions 1258 to facilitate sensor-related processing and functions; telephony instructions 1260 to facilitate telephone-related processes and functions; messaging instructions 1262 to facilitate electronic-messaging related processes and functions; web browser instructions 1264 to facilitate web browsing-related processes and functions; media processing instructions 1266 to facilitate media processing-related processes and functions; location services instructions including GPS and/or navigation instructions 1268 and Wi-Fi based location instructions to facilitate location based functionality; camera instructions 1270 to facilitate camera-related processes and functions; and/or other software instructions 1272 to facilitate other processes and functions, e.g., security processes and functions, and processes and functions related to the systems. The memory 1250 may also store other software instructions such as web video instructions to facilitate web video-related processes and functions; and/or web shopping instructions to facilitate web shopping-related processes and functions. In some implementations, the media processing instructions 1266 are divided into audio processing instructions and video processing instructions to facilitate audio processing-related processes and functions and video processing-related processes and functions, respectively. A mobile equipment identifier, such as an International Mobile Equipment Identity (IMEI) 1274 or a similar hardware identifier can also be stored in memory 1250.

Each of the above identified instructions and applications can correspond to a set of instructions for performing one or more functions described above. These instructions need not be implemented as separate software programs, procedures, or modules. The memory 1250 can include additional instructions or fewer instructions. Furthermore, various functions may be implemented in hardware and/or in software, including in one or more signal processing and/or application specific integrated circuits.

Figure 13:
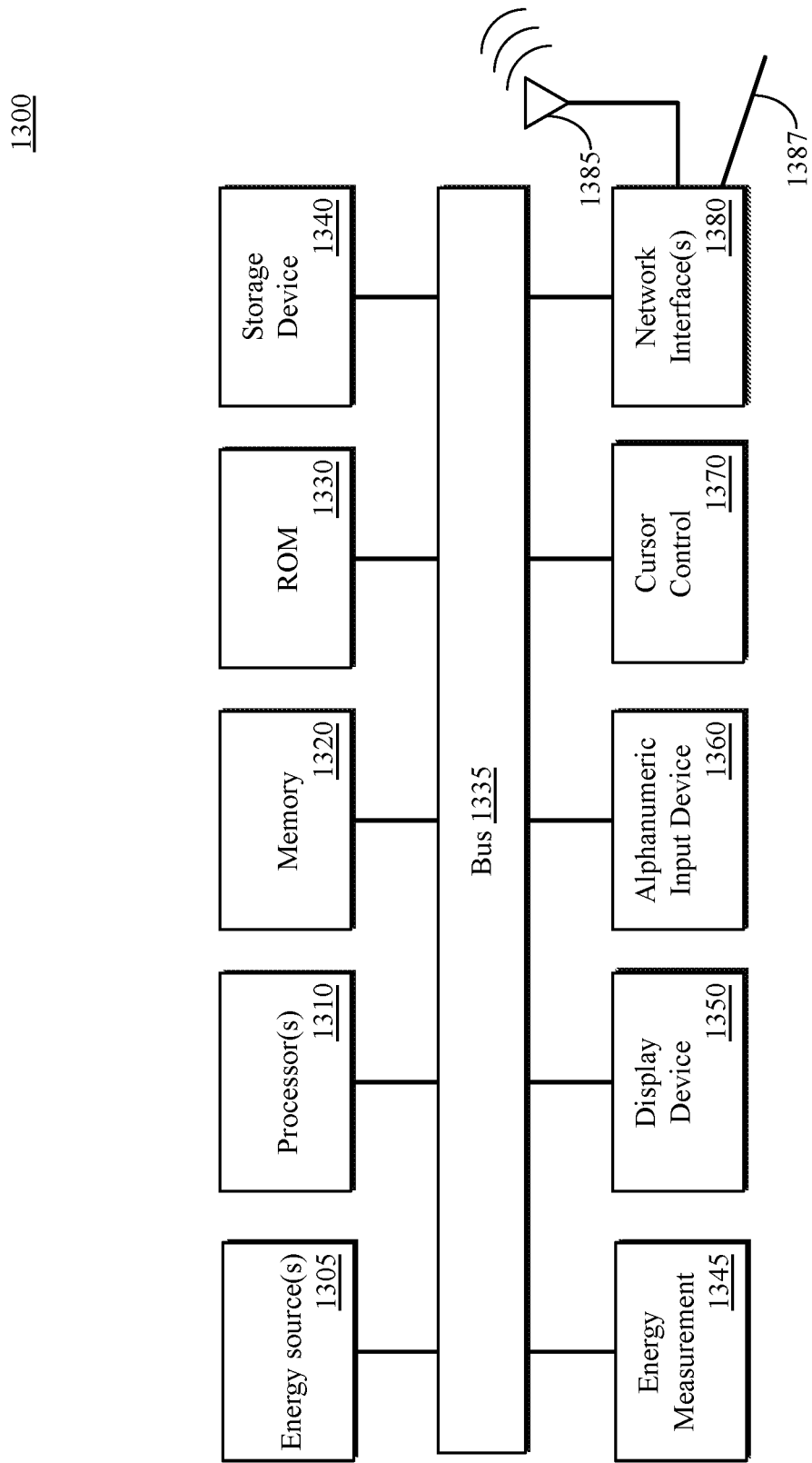
FIG. 13 is a block diagram illustrating an example computing system that can be used in conjunction with one or more of the embodiments of the disclosure.

FIG. 13 is a block diagram of a computing system 1300, according to an embodiment. The illustrated computing system 1300 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1300 can be used to provide the computing device and/or a server device to which the computing device may connect.

The computing system 1300 includes bus 1335 or other communication device to communicate information, and processor(s) 1310 coupled to bus 1335 that may process information. While the computing system 1300 is illustrated with a single processor, the computing system 1300 may include multiple processors and/or co-processors. The computing system 1300 further may include random access memory 1320 (RAM) or other dynamic storage device coupled to the bus 1335. The memory 1320 may store information and instructions that may be executed by processor(s) 1310. Main memory 1320 may also be used to store temporary variables or other intermediate information during execution of instructions by the processor(s) 1310.

The computing system 1300 may also include read only memory (ROM) 1330 and/or another data storage device 1340 coupled to the bus 1335 that may store information and instructions for the processor(s) 1310. The data storage device 1340 can be or include a variety of storage devices, such as a flash memory device, a magnetic disk, or an optical disc and may be coupled to computing system 1300 via the bus 1335 or via a remote peripheral interface.

The computing system 1300 may also be coupled, via the bus 1335, to a display device 1350 to display information to a user. The computing system 1300 can also include an alphanumeric input device 1360, including alphanumeric and other keys, which may be coupled to bus 1335 to communicate information and command selections to processor(s) 1310. Another type of user input device includes a cursor control 1370 device, such as a touchpad, a mouse, a trackball, or cursor direction keys to communicate direction information and command selections to processor(s) 1310 and to control cursor movement on the display device 1350. The computing system 1300 may also receive user input from a remote device that is communicatively coupled via one or more network interface(s) 1380.

The computing system 1300 further may include one or more network interface(s) 1380 to provide access to a network, such as a local area network. The network interface (s) 1380 may include, for example, a wireless network interface having antenna 1385, which may represent one or more antenna(e). The computing system 1300 can include multiple wireless network interfaces such as a combination of Wi-Fi, Bluetooth®, near field communication (NFC), and/or cellular telephony interfaces. The network interface (s) 1380 may also include, for example, a wired network interface to communicate with remote devices via network cable 1387, which may be, for example, an Ethernet cable, a coaxial cable, a fiber optic cable, a serial cable, or a parallel cable.

In one embodiment, the network interface(s) 1380 may provide access to a local area network, for example, by conforming to IEEE 802.11 standards, and/or the wireless network interface may provide access to a personal area network, for example, by conforming to Bluetooth standards. Other wireless network interfaces and/or protocols can also be supported. In addition to, or instead of, communication via wireless LAN standards, network interface (s) 1380 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1300 can further include one or more energy sources 1305 and one or more energy measurement systems 1345. Energy sources 1305 can include an AC/DC adapter coupled to an external power source, one or more batteries, one or more charge storage devices, a USB charger, or other energy source. Energy measurement systems include at least one voltage or amperage measuring device that can measure energy consumed by the computing system 1300 during a predetermined period of time. Additionally, one or more energy measurement systems can be included that measure, e.g., energy consumed by a display device, cooling subsystem, Wi-Fi subsystem, or other frequently used or high-energy consumption subsystem.

In some embodiments, the hash functions described herein can utilize specialized hardware circuitry (or firmware) of the system (client device or server). For example, the function can be a hardware-accelerated function. In addition, in some embodiments, the system can use a function that is part of a specialized instruction set. For example, the can use an instruction set which may be an extension to an instruction set architecture for particular a type of microprocessors. Accordingly, in an embodiment, the system can provide a hardware-accelerated mechanism for performing cryptographic operations to improve the speed of performing the functions described herein using these instruction sets.

In addition, the hardware-accelerated engines/functions are contemplated to include any implementations in hardware, firmware, or combination thereof, including various configurations which can include hardware/firmware integrated into the SoC as a separate processor, or included as special purpose CPU (or core), or integrated in a coprocessor on the circuit board, or contained on a chip of an extension circuit board, etc.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. An electronic device, comprising:
a memory configured to store computer-executable instructions and a set of synchronization data associated with an interaction between the electronic device and one or more applications; and
one or more processors coupled to the memory and configured to execute the one or more instructions to:
obtain a plurality of different types of event data associated with at least one of the electronic device or another electronic device, the plurality of different types of event data comprising action data, context data, or device status data;
aggregate the plurality of different types of event data into the set of synchronization data that is associated with the interaction between the electronic device and the one or more applications, the synchronization data is configured to be transmitted from the electronic device;
determine one or more characteristics of the set of synchronization data;
receive bandwidth information for each of a set of transport channels including at least one of a peer-to-peer channel or a network-based channel;
determine an availability of the peer-to-peer channel or the network-based channel based at least in part on the bandwidth information and the one or more characteristics of the set of synchronization data;
select the peer-to-peer channel or the network-based channel for transmitting the set of synchronization data based at least in part on the determined availability, a transport channel selected from the set of transport channels; and
after the transport channel is selected, transmit the set of synchronization data for the one or more applications from the electronic device to one or more remote devices that include the one or more applications via the selected transport channel, wherein the one or more remote devices are selected based at least in part on an advertisement, from the electronic device, that indicates a state change of the synchronization data.

2. The electronic device as in claim 1, wherein the one or more characteristics comprise at least one of a size of the set of synchronization data, a time parameter associated with the set of synchronization data, or a type of data within the synchronization data.

3. The electronic device as in claim 2, wherein the one or more processors are further configured to execute the one or more instructions to:
determine whether data in the set of synchronization data is suitable for direct transport to a remote device of the one or more remote devices via a peer-to-peer connection based at least in part on at least one of the one or more characteristics of the set of synchronization data, and in response to a determination that the data is not suitable for direct transport to the remote device via the peer-to-peer connection, to establish a network based communication connection.

4. The electronic device as in claim 3, wherein the one or more processors are further configured to execute the one or more instructions to:
transmit the set of synchronization data via a network-based communication connection, wherein to transmit the set of synchronization data includes to transmit the set of synchronization data to a remote storage location via the network-based communication connection and indicate to the one or more remote devices that updated data is available on the remote storage location.

5. The electronic device as in claim 3, wherein the one or more processors are further configured to execute the one or more instructions to:
determine whether the data in the set of synchronization data is suitable for direct transport to the remote device via the peer-to-peer connection, and in response to a determination that the data is suitable for direct transport to the remote device via the peer-to-peer connection, to determine whether the peer-to-peer connection is available with the remote device.

6. The electronic device as in claim 5, wherein the one or more processors are further configured to execute the one or more instructions to, in response to a determination that the peer-to-peer connection is not available with the remote device, to establish a network-based communication connection.

7. The electronic device as in claim 6, wherein the one or more processors are further configured to execute the one or more instructions to:
determine that the peer-to-peer connection is not available with the remote device based at least in part on a determination of a sleep state of the remote device.

8. The electronic device as in claim 6, wherein the one or more processors are further configured to execute the one or more instructions to:
transmit the set of synchronization data via the network-based communication connection.

9. The electronic device as in claim 8, wherein the one or more processors are further configured to execute the one or more instructions to, in response to a determination that the peer-to-peer connection is available with the remote device, establish a peer-to-peer communication connection.

10. The electronic device as in claim 9, wherein the one or more processors are further configured to execute the one or more instructions to transmit the set of synchronization data via the peer to-peer communication connection.

11. The electronic device as claimed in claim 1, wherein the advertisement sent by the electronic device comprises a status bit indicating that the electronic device is looking for a remote device.

12. A non-transitory machine-readable medium storing instructions which, when executed by one or more processors of an electronic device configured with a set of synchronization data associated with an interaction between the electronic device and one or more applications, cause the one or more processors to perform operations comprising:
obtaining a plurality of different types of event data associated with at least one of the electronic device or another electronic device, the plurality of different types of event data comprising action data, context data, or device status data;
aggregating the plurality of different types of event data into the set of synchronization data that is associated with the interaction between the electronic device and the one or more applications, the synchronization data is configured to be transmitted from the electronic device to one or more remote devices;

determining one or more characteristics of the set of synchronization data;

receiving bandwidth information for each of a set of transport channels including at least one of a peer-to-peer channel or a network-based channel;

determining an availability of the peer-to-peer channel or the network-based channel based at least in part on the bandwidth information and the one or more characteristics of the set of synchronization data;

selecting the peer-to-peer channel or the network-based channel for transmitting the set of synchronization data based at least in part on the determined availability, a transport channel selected from the set of transport channels; and after the transport channel is selected, transmitting the set of synchronization data from the electronic device to the one or more remote devices that include the one or more applications via the selected transport channel, wherein the one or more remote devices are selected based at least in part on an advertisement from the electronic device, that indicates a state change of the synchronization data.

13. The non-transitory machine-readable medium as in claim 12, the operations additionally comprising determining the one or more characteristics of the set of synchronization data, the one or more characteristics comprising a size of the set of synchronization data, a time parameter associated with the set of synchronization data, or a type of data within the synchronization data.

14. The non-transitory machine-readable medium as in claim 13, the operations additionally comprising:

determining whether data in the set of synchronization data is suitable for direct transport to a remote device of the one or more remote devices via a peer-to-peer connection based at least in part on at least one of the one or more characteristics of the set of synchronization data, and in response to a determination that the data is not suitable for direct transport to the remote device via the peer-to-peer connection, establishing a network-based communication connection.

15. The non-transitory machine-readable medium as in claim 14, the operations additionally comprising:

transmitting the set of synchronization data via the network-based communication connection, wherein transmitting the set of synchronization data includes transmitting the set of synchronization data to a remote storage location via the network-based communication connection and indicating to the one or more remote devices that updated data is available on the remote storage location.

16. The non-transitory machine-readable medium as in claim 14, the operations additionally comprising:

determining whether the data in the set of synchronization data is suitable for direct transport to the remote device via the peer-to-peer connection, and in response to a determination that the data is suitable for direct transport to the remote device via the peer-to-peer connection, determining whether the peer-to-peer connection is available with the remote device.

17. The non-transitory machine-readable medium as in claim 16, the operations additionally comprising, in response to a determination that the peer-to-peer connection is not available with the remote device, establishing the network-based communication connection.

18. The non-transitory machine-readable medium as in claim 17, the operations additionally comprising determining that the peer-to-peer connection is not available with the remote device based at least in part on a determination of a sleep state of the remote device.

19. The non-transitory machine-readable medium as in claim 17, the operations additionally comprising:

transmitting the set of synchronization data via the network-based communication connection.

20. A method, comprising:

obtaining a plurality of different types of event data associated with at least one of an electronic device or another electronic device, the plurality of different types of event data comprising action data, context data, or device status data;

storing a set of synchronization data associated with an interaction between the electronic device and one or more applications;

aggregating the plurality of different types of event data into the set of synchronization data that is associated with the interaction between the electronic device and the one or more applications, the synchronization data is configured to be transmitted from the electronic device to one or more remote devices;

determining one or more characteristics of the set of synchronization data;

receiving bandwidth information for each of a set of transport channels including at least one of a peer-to-peer channel or a network-based channel;

determining an availability of the peer-to-peer channel or the network-based channel based at least in part on the bandwidth information and the one or more characteristics of the set of synchronization data;

selecting the peer-to-peer channel or the network-based channel for transmitting the set of synchronization data based at least in part on the determined availability, a transport channel selected from the set of transport channels; and after the transport channel is selected, transmitting the set of synchronization data for the one or more applications from the electronic device to the one or more remote devices that include the one or more applications via the selected transport channel, wherein the one or more remote devices are selected based at least in part on an advertisement, from the electronic device, that indicates a state change of the synchronization data.

* * * * *